US011505239B2

(12) United States Patent
Suzuki et al.

(10) Patent No.: US 11,505,239 B2
(45) Date of Patent: Nov. 22, 2022

(54) STEERING SYSTEM AND METHOD FOR MANUFACTURING STEERING SYSTEM

(71) Applicant: JTEKT CORPORATION, Osaka (JP)

(72) Inventors: Kunihiko Suzuki, Gamagori (JP); Hiroki Yamahana, Kashiba (JP); Ryuta Suzuki, Okazaki (JP); Takayuki Suzuki, Gamagori (JP); Daisuke Nishio, Chita-gun (JP)

(73) Assignee: JTEKT CORPORATION, Osaka (JP)

( * ) Notice: Subject to any disclaimer, the term of this patent is extended or adjusted under 35 U.S.C. 154(b) by 589 days.

(21) Appl. No.: 16/582,377

(22) Filed: Sep. 25, 2019

(65) Prior Publication Data
US 2020/0122772 A1 Apr. 23, 2020

(30) Foreign Application Priority Data

Oct. 1, 2018 (JP) .............................. JP2018-186887
Oct. 10, 2018 (JP) .............................. JP2018-192123

(51) Int. Cl.
B62D 5/04       (2006.01)
B21D 53/10     (2006.01)
(Continued)

(52) U.S. Cl.
CPC ........... B62D 5/0448 (2013.01); B21D 53/10 (2013.01); F16C 19/183 (2013.01); F16H 25/2214 (2013.01); F16H 25/24 (2013.01)

(58) Field of Classification Search
CPC .... F16H 25/24; F16H 25/2214; F16C 19/183; B21D 53/10; B62D 5/0448
See application file for complete search history.

(56) References Cited

U.S. PATENT DOCUMENTS 9,004,222 B2 * 4/2015 Kaneko ............... B62D 5/0448
                                                              180/443
2009/0255752 A1 10/2009 Asakura et al.
(Continued)

FOREIGN PATENT DOCUMENTS

DE   102012007329 A1   10/2013
EP       2270349 A1    1/2011
(Continued)

OTHER PUBLICATIONS

Mar. 5, 2020 Search Report issued in European Patent Application No. 19200460.4.
(Continued)

Primary Examiner — Randell J Krug
(74) Attorney, Agent, or Firm — Oliff PLC

(57) ABSTRACT

A steering system includes a steered shaft, a ball screw nut, balls, a housing, a rolling bearing, and a snap ring configured to prevent the rolling bearing from detaching from the ball screw nut. The rolling bearing includes double-row rolling element arrays, an outer ring, a first inner ring, and a second inner ring. The ball screw nut has a receiving portion. The snap ring contacts a side face of the second inner ring to push the second inner ring toward the receiving portion via the first inner ring. A resistance force received from the second outer peripheral fitting surface when the second inner ring moves in the axial direction in a state in which detachment of the rolling bearing is not prevented by the snap ring is smaller than a pushing force with which the snap ring pushes the second inner ring.

21 Claims, 13 Drawing Sheets

(51) Int. Cl.
    *F16C 19/18*     (2006.01)
    *F16H 25/22*     (2006.01)
    *F16H 25/24*     (2006.01)

(56) References Cited

U.S. PATENT DOCUMENTS

| | | | |
|---|---|---|---|
| 2011/0000330 A1* | 1/2011 | Doeppling | B62D 5/0448 |
| | | | 29/898.07 |
| 2014/0345966 A1* | 11/2014 | Asakura | B62D 5/0445 |
| | | | 180/444 |
| 2014/0353070 A1* | 12/2014 | Tsukagoshi | B62D 5/0424 |
| | | | 180/444 |
| 2019/0161111 A1 | 5/2019 | Kondo et al. | |

FOREIGN PATENT DOCUMENTS

| | | | | |
|---|---|---|---|---|
| JP | 2003002220 A | * | 1/2003 | ........... B62D 5/0424 |
| JP | 2005233358 A | | 9/2005 | |
| JP | 2011-012812 A | | 1/2011 | |
| JP | 5120040 B2 | | 1/2013 | |
| JP | 2018-119630 A | | 8/2018 | |
| JP | 2018119630 A | * | 8/2018 | |
| JP | 2019-107989 A | | 7/2019 | |

OTHER PUBLICATIONS

Aug. 30, 2022 Office Action issued in Japanese Patent Application No. 2018-186887.
Aug. 30, 2022 Office Action issued in Japanese Patent Application No. 2018-192123.

\* cited by examiner

STEERING SYSTEM AND METHOD FOR MANUFACTURING STEERING SYSTEM

INCORPORATION BY REFERENCE

The disclosure of Japanese Patent Application No. 2018-186887 filed on Oct. 1, 2018 and Japanese Patent Application No. 2018-192123 filed on Oct. 10, 2018, each including the specification, drawings and abstract, is incorporated herein by reference in its entirety.

BACKGROUND

1. Technical Field

The present disclosure relates to a steering system including a ball screw mechanism. The present disclosure also relates to a steering system and a method for manufacturing the steering system.

2. Description of Related Art

Hitherto, there are steering systems configured to turn steered wheels (front wheels) of a vehicle. Among the steering systems, there is a steering system in which a movement force in a vehicle width direction is applied to a steered shaft (rack shaft) by a ball screw mechanism using an electric motor as a drive source (see, for example, Japanese Unexamined Patent Application Publication No. 2018-119630 (JP 2018-119630 A)).

In the steering system described in JP 2018-119630 A, a torque of the electric motor is transmitted to a ball screw nut via a belt and a driven pulley, and the ball screw nut rotates relative to the rack shaft. Ball screw grooves are formed on the inner peripheral surface of the ball screw nut and the outer peripheral surface of the rack shaft. A plurality of balls circulate along the ball screw grooves. The ball screw nut is arranged inward of the driven pulley, and rotates together with (i.e., integrally with) the driven pulley.

The ball screw nut and the driven pulley are housed in a housing. A bearing having double-row rolling element arrays is arranged between the outer peripheral surface of the driven pulley and the inner surface of the housing. The bearing is a double-row angular contact (DAC) bearing. A preload is applied to a pair of inner rings by a lock nut threadedly attached to the driven pulley. Further, a snap ring is fitted to the outer peripheral surface of the driven pulley to prevent loosening of the lock nut.

Hitherto, there is an assist type steering system in which an operation of a rack shaft is assisted by generating an axial thrust in the shaft using an electric motor. In this steering system, an external thread is formed on the outer peripheral surface of the shaft, and an internal thread is formed on the inner peripheral surface of a nut arranged radially outward of the shaft. A ball screw apparatus is formed by arranging a plurality of balls between the external thread and the internal thread that face each other.

In general, the nut is formed into a tubular shape, and one end side of the nut is supported on a housing via a rolling bearing. A rotational driving force is transmitted from the motor to the other end side of the nut. It is desirable that the rolling bearing that supports the one end side of the nut should have a high rigidity so that the rotation axis position of the nut driven to rotate by the motor is maintained accurately.

As an example of the rolling bearing that can meet such a demand, there is a double-row angular contact ball bearing (double-row bearing) in which a high support rigidity can be obtained by applying a preload in a thrust direction to an inner ring or an outer ring to eliminate internal gaps between balls and a raceway of the outer ring and between the balls and a raceway of the inner ring. For example, a technology described in Japanese Unexamined Patent Application Publication No. 2011-12812 (JP 2011-12812 A) may be used as a measure to restrict axial movement of the double-row angular contact ball bearing at low costs.

In the technology described in JP 2011-12812 A, axial movement of the rolling bearing is restricted by using a retainer (support ring). Specifically, one axial end face of the retainer contacts the end face of one inner ring of the double-row angular contact ball bearing, the one inner ring being located close to the retainer. The other axial side of the retainer is deformed so that the diameter decreases, and a part of the deformed portion is pushed into a groove formed to extend in a circumferential direction on the outer peripheral surface of the nut. The other end face of the retainer contacts the side face of the groove. Thus, the retainer is retained so that its axial movement is disabled between the end face of the one inner ring of the double-row angular contact ball bearing and the side face of the groove. Accordingly, the inner ring of the double-row angular contact ball bearing that contacts the one end face of the retainer is also immovable toward the retainer, whereby the axial movement of the inner ring is restricted.

SUMMARY

In the technology described in JP 2018-119630 A, an operation of threadedly attaching the lock nut and fitting the snap ring for preventing loosening is cumbersome, which hinders cost reduction. The inventors have considered crimping the snap ring and fitting the snap ring to the recess formed in the ball screw nut such that this snap ring prevents detachment of the bearing. When the detachment of the bearing is prevented in this manner, however, a sufficient force for pushing the pair of inner rings is not always obtained. When the ball screw nut receives a reverse input from the steered wheel via the rack shaft, there is a case where one inner ring moves in the axial direction relative to the ball screw nut and does not return to the original position. In this case, the rattling (backlash) of the ball screw nut occurs in the housing due to a decrease in the preload. Therefore, abnormal noise is likely to occur.

In the technology described in JP 2011-12812 A, the other end face of the retainer contacts the side face of the groove by deforming the retainer and pushing the retainer into the groove formed on the outer peripheral surface of the nut. Therefore, when the other axial side of the retainer is deformed so that the diameter decreases and the retainer is pushed into the groove, it is difficult to determine whether the other end face of the retainer formed by the portion pushed into the groove securely contacts the side face of the groove. If the other end face of the retainer does not contact the side face of the groove, there is a possibility that the axial movement of the bearing cannot be appropriately restricted.

The present disclosure provides a steering system in which the occurrence of abnormal noise can be reduced while detachment of a pair of inner rings of a bearing that supports a ball screw nut is prevented by a snap ring fitted to the ball screw nut. The present disclosure also provides a steering system including a support unit having a low cost structure in which axial movement of a bearing can be restricted securely, and a method for manufacturing the steering system.

A first aspect of the disclosure relates to a steering system including a steered shaft having an outer peripheral ball screw groove helically provided on an outer peripheral surface and configured to move in an axial direction of the steered shaft to turn steered wheels of a vehicle; a ball screw nut having a tubular shape and having an inner peripheral ball screw groove helically provided on an inner peripheral surface, the steered shaft being inserted through a center of the ball screw nut; a plurality of balls configured to circulate along the outer peripheral ball screw groove and the inner peripheral ball screw groove; a housing that houses the ball screw nut; a rolling bearing arranged between an outer peripheral surface of the ball screw nut and an inner surface of the housing and configured to support the ball screw nut such that the ball screw nut is rotatable relative to the housing; and a snap ring fitted to a recess provided on the outer peripheral surface of the ball screw nut and configured to prevent the rolling bearing from detaching from the ball screw nut. The rolling bearing includes double-row rolling element arrays arranged side by side in an axial direction of the ball screw nut; an outer ring having a pair of raceway surfaces on each of which a plurality of rolling elements of a corresponding one of the double-row rolling element arrays roll; a first inner ring having a raceway surface on which the plurality of rolling elements of one of the double-row rolling element arrays roll; and a second inner ring having a raceway surface on which the plurality of rolling elements of another of the double-row rolling element arrays roll. The ball screw nut has a receiving portion that protrudes outward relative to a first outer peripheral fitting surface to which the first inner ring is externally fitted, the receiving portion contacting a side face of the first inner ring, and the ball screw nut has a second outer peripheral fitting surface to which the second inner ring is externally fitted, the second outer peripheral fitting surface being located closer to the recess than the first outer peripheral fitting surface is. The snap ring contacts a side face of the second inner ring to push the second inner ring toward the receiving portion via the first inner ring. A resistance force received from the second outer peripheral fitting surface when the second inner ring moves in the axial direction of the ball screw nut in a state in which detachment of the rolling bearing is not prevented by the snap ring is smaller than a pushing force with which the snap ring pushes the second inner ring.

In the steering system of the aspect of the present disclosure, the occurrence of abnormal noise can be reduced while detachment of the pair of inner rings of the bearing that supports the ball screw nut is prevented by the snap ring fitted to the ball screw nut.

A second aspect of the disclosure relates to a steering system including a housing; a shaft supported by the housing, having opposite ends coupled to steered wheels via link mechanisms, and configured to turn the steered wheels by moving in an axial direction of the shaft relative to the housing; a ball screw apparatus including an outer peripheral rolling groove provided on an outer peripheral surface of the shaft, a nut having a tubular shape and arranged radially outward of the outer peripheral rolling groove, an inner peripheral rolling groove provided on an inner peripheral surface of the nut, and a plurality of rolling elements configured to roll between the outer peripheral rolling groove and the inner peripheral rolling groove; a driving force application apparatus configured to apply a driving force in the axial direction to the shaft by rotating the nut of the ball screw apparatus using a motor as a drive source; and a support unit configured to support the nut in the housing.

The support unit includes an annular groove provided on an outer peripheral surface of the nut at a position at a first end side in the axial direction and having a first groove side face at the first end side and a second groove side face at a second end side, the first groove side face and the second groove side face extending in a circumferential direction and facing each other in the axial direction; a bearing support portion provided on the outer peripheral surface of the nut at a position closer to the second end side than the annular groove is; a rolling bearing including an outer ring supported on the housing, and an inner ring supported on the bearing support portion so as not to be movable in the axial direction and having a first inner ring end face on a side of the annular groove; a retainer including an inner ring contact portion having an inner ring contact portion end face that contacts the first inner ring end face, and an entry portion having a first entry portion end face that contacts the first groove side face of the annular groove in a state in which the first inner ring end face contacts the inner ring contact portion end face, and a second entry portion end face that faces the second groove side face via a clearance; and a clearance member arranged in the clearance such that the clearance member is in contact with the second groove side face and the second entry portion end face.

The entry portion of the retainer of the support unit enters the annular groove. The inner ring contact portion end face at one of the two ends of the retainer contacts the first inner ring end face of the inner ring. The first entry portion end face of the entry portion contacts the first groove side face of the annular groove. Thus, the retainer securely restricts the movement of the rolling bearing toward the retainer. In the present disclosure, the clearance member is arranged in the clearance in the annular groove such that the clearance member is in contact with the second groove side face and the second entry portion end face. Therefore, the entry portion is immovable toward the second end side in the annular groove. Thus, the first entry portion end face is not located (i.e., is not moved) away from the first groove side face of the annular groove. Accordingly, the retainer can securely restrict the movement of the rolling bearing toward the retainer. With the significantly low cost structure in which the clearance member is added in the clearance in the annular groove, the retainer can further securely prevent the movement of the inner ring of the bearing toward the first end side.

A third aspect of the disclosure relates to a method for manufacturing the steering system according to the second aspect. The method includes attaching the retainer of the support unit to the nut. The attaching the retainer includes a first step of fitting a retainer workpiece having a tubular shape, which is a workpiece of the retainer, to an outer periphery of the nut at a position at the first end side; a second step of inserting, into a punch having a tubular shape and serving as a jig, a distal end of the retainer workpiece having the tubular shape and extending in the axial direction, and urging the punch from the first end side to the second end side to bring an end face at the second end side in the retainer workpiece into contact with an end face at the first end side in the inner ring; a third step of advancing the punch from the first end side to the second end side to transfer an inner shape of the punch to an outer peripheral surface of the retainer workpiece, plastically deforming a portion of the retainer workpiece such that the portion of the retainer workpiece enters the annular groove, and bringing an end face facing the second groove side face of the annular groove into contact with the clearance member to form an entry portion workpiece, which is a workpiece of the entry portion, the second groove side face facing the first groove side face; and a fourth step of retreating the punch from the second end side to the first end side to form the entry portion by releasing a compressive stress applied to the entry portion workpiece in an advancing direction of the punch.

In the manufacturing method, when the punch retreats in the fourth step to release the compressive stress applied to the entry portion workpiece, the entry portion workpiece expands by an amount corresponding to the compressive stress applied in the advancing direction and a Young's modulus (i.e., a modulus of longitudinal elasticity) of the entry portion workpiece. In the clearance in the annular groove, the clearance member is arranged in contact with the second groove side face and the second entry portion end face in the state in which the punch retreats to release the compressive stress. In other words, in a state in which the compressive stress applied to the entry portion workpiece is not released, the clearance member is also compressed by a predetermined amount. Therefore, in the state in which the compressive stress is released, the clearance member expands by an amount corresponding to the compressive stress in the advancing direction and a Young's modulus of the clearance member similarly to the entry portion workpiece. Through the expansion of both the entry portion workpiece and the clearance member when the compressive stress is released, the contact between the clearance member and each of the second groove side face and the second entry portion end face is secured satisfactorily. Therefore, the entry portion cannot move toward the second end side in the annular groove. Thus, the retainer can securely restrict the movement of the rolling bearing toward the retainer.

A fourth aspect of the disclosure relates to a steering system including a housing; a shaft supported in the housing, having opposite ends coupled to steered wheels via link mechanisms, and configured to turn the steered wheels by moving in an axial direction of the shaft relative to the housing; a ball screw apparatus including an outer peripheral rolling groove provided on an outer peripheral surface of the shaft, a nut having a tubular shape and arranged radially outward of the outer peripheral rolling groove, an inner peripheral rolling groove provided on an inner peripheral surface of the nut, and a plurality of rolling elements configured to roll between the outer peripheral rolling groove and the inner peripheral rolling groove; a driving force application apparatus configured to apply a driving force in the axial direction to the shaft by rotating the nut of the ball screw apparatus using a motor as a drive source; and a support unit configured to support the nut in the housing.

The support unit includes an annular groove provided on an outer peripheral surface of the nut at a position at a first end side in the axial direction and having a first groove side face at the first end side and a second groove side face at a second end side, the first groove side face and the second groove side face extending in a circumferential direction and facing each other in the axial direction; a bearing support portion provided on the outer peripheral surface of the nut at a position closer to the second end side than the annular groove is; a rolling bearing including an outer ring supported on the housing, and an inner ring supported on the bearing support portion so as not to be movable in the axial direction and having a first inner ring end face on a side of the annular groove; and a retainer including an inner ring contact portion having an inner ring contact portion end face that contacts the first inner ring end face, and an entry portion having a first entry portion end face that contacts the first groove side face of the annular groove in a state in which the first inner ring end face contacts the inner ring contact portion end face, and a second entry portion end face that contacts the second groove side face. Thus, it is possible to obtain a steering system having effects similar to those of the steering system of the second aspect.

A fifth aspect of the disclosure relates to a method for manufacturing the steering system according to the fourth aspect, comprising attaching the retainer of the support unit to the nut. The attaching the retainer includes a first step of fitting a retainer workpiece having a tubular shape, which is a workpiece of the retainer, to an outer periphery of the nut at a position at the first end side; a second step of inserting, into a punch having a tubular shape and serving as a jig, a distal end of the retainer workpiece having the tubular shape and extending in the axial direction, and urging the punch from the first end side to the second end side to bring an end face at the second end side in the retainer workpiece into contact with an end face at the first end side in the inner ring; a third step of advancing the punch from the first end side to the second end side to transfer an inner shape of the punch to an outer peripheral surface of the retainer workpiece, plastically deforming a portion of the retainer workpiece such that the portion of the retainer workpiece enters the annular groove, and bringing an end face facing the second groove side face of the annular groove into contact with the second groove side face to form an entry portion workpiece, which is a workpiece of the entry portion, the second groove side face facing the first groove side face; and a fourth step of retreating the punch from the second end side to the first end side to form the entry portion by releasing a compressive stress applied to the entry portion workpiece in an advancing direction of the punch. Thus, it is possible to manufacture a steering system having effects similar to those of the steering system manufactured by the manufacturing method according to the fourth aspect.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A first embodiment of the present disclosure is described with reference to the drawings. The following embodiments are provided as specific examples for carrying out the present disclosure, and the technical scope of the present disclosure is not limited to the specific examples.

Figure 1:
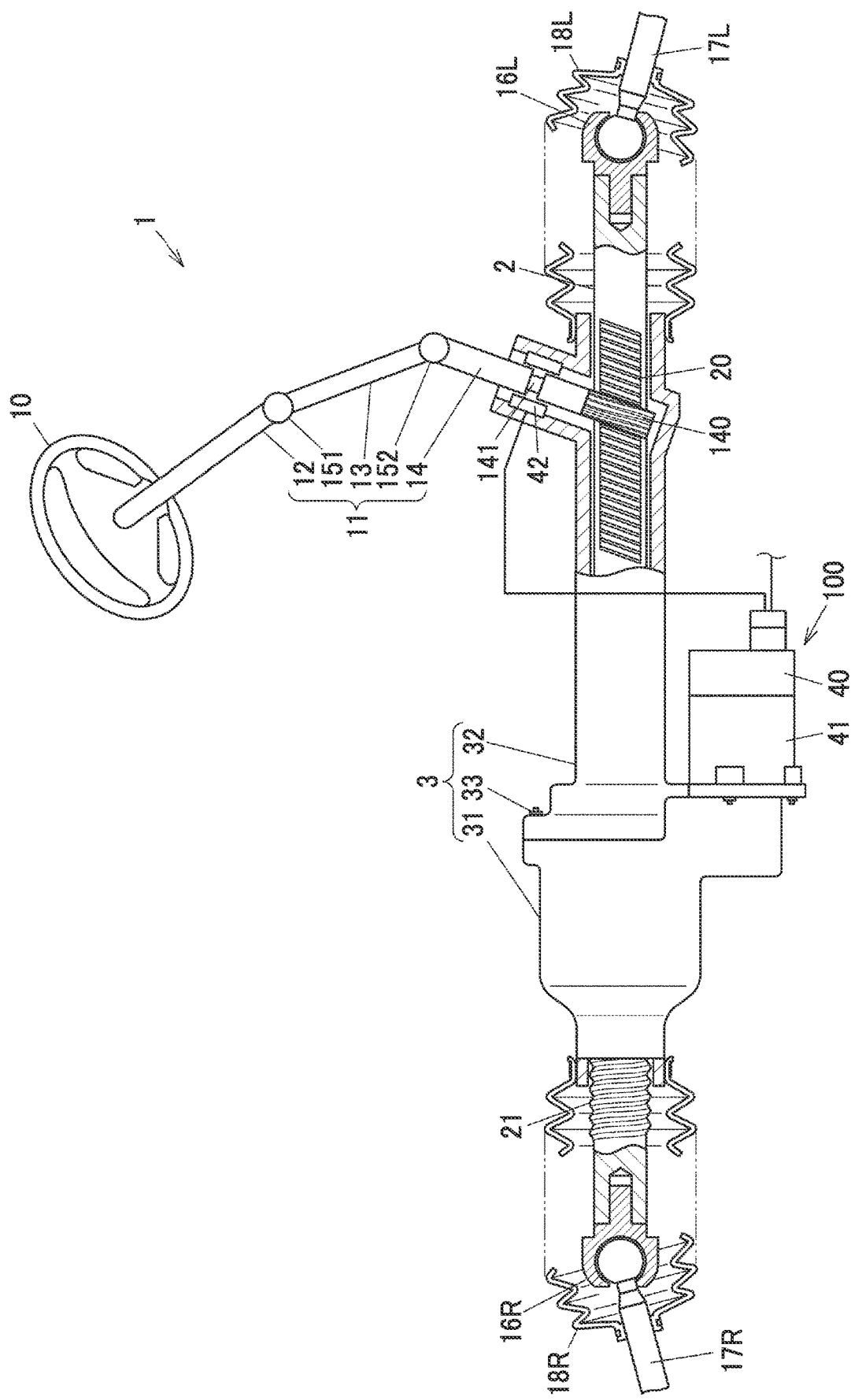
FIG. 1 is a schematic diagram illustrating the overall structure of a steering system including a ball screw mechanism according to a first embodiment of the present disclosure.
Figure 2:
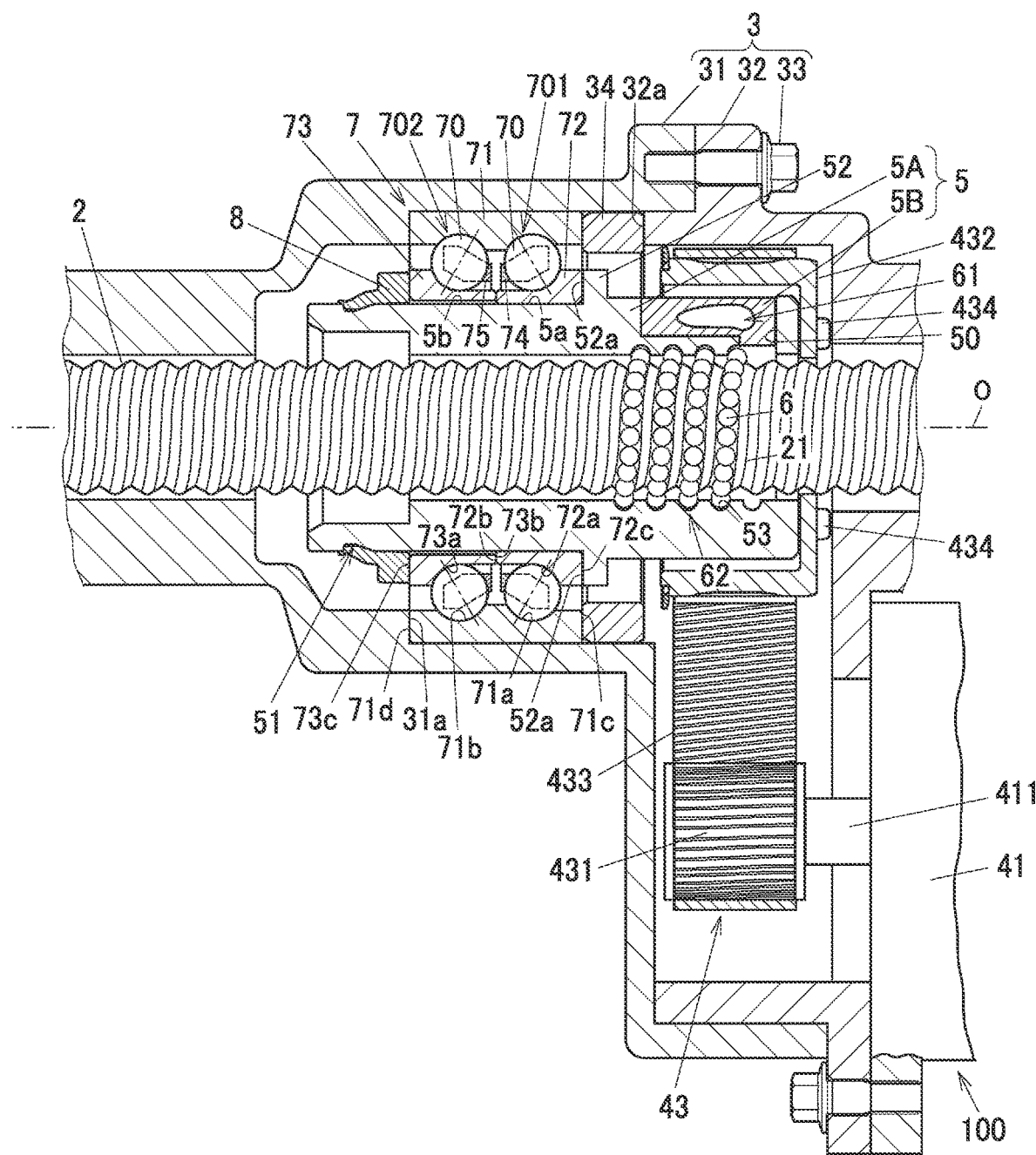
FIG. 2 is a sectional view illustrating a partial structure of the steering system.

FIG. 1 is a schematic diagram illustrating the overall structure of a steering system including a ball screw mechanism according to the first embodiment of the present disclosure. FIG. 2 is a sectional view illustrating a partial structure of the steering system illustrated in FIG. 1.

A steering system 1 is mounted on a vehicle, and turns right and left front wheels that are steered wheels in response to a driver's steering operation. FIG. 1 illustrates the steering system viewed from a front side of the vehicle. The left side of FIG. 1 is a right side of the vehicle, and the right side of FIG. 1 is a left side of the vehicle. In FIG. 1, the letter "R" in reference symbols represents the right side of the vehicle, and the letter "L" represents the left side of the vehicle.

The steering system 1 includes a steering shaft 11, a rack shaft 2, a housing 3, and a steering assist apparatus 100. A steering wheel 10 to be steered by the driver is coupled to the steering shaft 11. The rack shaft 2 serves as a steered shaft that reciprocates in an axial direction thereof along a vehicle width direction in response to the steering operation for the steering wheel 10. The housing 3 houses the rack shaft 2. The steering assist apparatus 100 generates a steering assist force based on a steering torque applied to the steering wheel 10.

The steering shaft 11 includes a column shaft 12, an intermediate shaft 13, and a pinion shaft 14. The steering wheel 10 is fixed to one end of the column shaft 12. The intermediate shaft 13 is coupled to the column shaft 12 via a universal joint 151. The pinion shaft 14 is coupled to the intermediate shaft 13 via a universal joint 152. For example, the universal joints 151 and 152 are Cardan joints.

The pinion shaft 14 has pinion teeth 140 formed at its distal end. The rack shaft 2 has rack teeth 20 that mesh with the pinion teeth 140. Further, the rack shaft 2 has an outer peripheral ball screw groove 21 helically formed on its outer peripheral surface at an end opposite to the end where the rack teeth 20 are formed. The pinion shaft 14 includes a flexible torsion bar 141 to be twisted by the steering torque applied to the steering wheel 10.

The steering system 1 includes ball joints 16R and 16L, right and left tie rods 17R and 17L, and bellows 18R and 18L. The ball joints 16R and 16L are attached to opposite ends of the rack shaft 2 that protrude from the housing 3. The tie rods 17R and 17L are coupled to the rack shaft 2 by the ball joints 16R and 16L in a pivotable manner, respectively. The bellows 18R and 18L have an accordion structure and are arranged between opposite ends of the housing 3 and the tie rods 17R and 17L, respectively. The rack shaft 2 turns the right and left front wheels via the ball joints 16R and 16L and the right and left tie rods 17R and 17L through the axial movement along the vehicle width direction.

The steering assist apparatus 100 includes a controller 40, an electric motor 41, a torque sensor 42, and a speed reducing mechanism 43. The electric motor 41 is controlled by the controller 40. The torque sensor 42 detects the steering torque. The speed reducing mechanism 43 reduces the speed of rotation of a motor shaft 411 of the electric motor 41. The torque sensor 42 detects the steering torque based on the magnitude of a torsion angle of the torsion bar 141, and sends a detection signal to the controller 40. The controller 40 controls the electric motor 41 so that an appropriate steering assist force is applied to the rack shaft 2 based on the steering torque, a vehicle speed, and the like.

The steering assist apparatus 100 includes a tubular ball screw nut 5, a plurality of balls 6, a rolling bearing 7, and a snap ring 8. The rack shaft 2 is inserted through the center of the ball screw nut 5. The balls 6 are arranged between the ball screw nut 5 and the rack shaft 2. The rolling bearing 7 supports the ball screw nut 5 so that the ball screw nut 5 is rotatable relative to the housing 3. The snap ring 8 is fitted to a recess 51 formed on the outer peripheral surface of the ball screw nut 5 to prevent the rolling bearing 7 from detaching from the ball screw nut 5. The rolling bearing 7 is arranged between the snap ring 8 and a receiving portion 52 provided on the ball screw nut 5.

The ball screw nut 5 includes a cylindrical body 5A and a deflector 5B. The body 5A is made of carburized steel. The deflector 5B is attached to a through hole 50 formed in the body 5A. The ball screw nut 5 is housed in the housing 3. The recess 51 and the receiving portion 52 are provided on the body 5A. An inner peripheral ball screw groove 53 is helically formed on the inner peripheral surface of the body 5A. The deflector 5B has a ball recirculation path 61 for the balls 6. Along with rotation of the ball screw nut 5, the balls 6 circulate along a ball rolling path 62 and the ball recirculation path 61 of the deflector 5B. The ball rolling path 62 is defined by the inner peripheral ball screw groove 53 and the outer peripheral ball screw groove 21 of the rack shaft 2. The rolling bearing 7 is arranged between the outer peripheral surface of the body 5A of the ball screw nut 5 and the inner surface of the housing 3.

The ball screw nut 5 is rotated relative to the rack shaft 2 by a torque of the electric motor 41 that is transmitted by the speed reducing mechanism 43. The speed reducing mechanism 43 includes a driving pulley 431, a driven pulley 432, and a belt 433. The driving pulley 431 rotates together with (integrally with) the shaft 411 of the electric motor 41. The driven pulley 432 is attached to the ball screw nut 5. The belt 433 is made of synthetic rubber and is wound around the driving pulley 431 and the driven pulley 432. The outside diameter of the driven pulley 432 is larger than the outside diameter of the driving pulley 431. A rotational force of the driving pulley 431 is transmitted to the driven pulley 432 by the belt 433 through speed reduction. The driven pulley 432 is fixed to the body 5A of the ball screw nut 5 with a plurality of bolts 434.

The rolling bearing 7 includes double-row rolling element arrays 701 and 702, an outer ring 71, a first inner ring 72, a second inner ring 73, a cage 74, and a cage 75. The double-row rolling element arrays 701 and 702 are arranged side by side in an axial direction of the ball screw nut 5. The outer ring 71 has a pair of raceway surfaces 71a and 71b. A plurality of rolling elements 70 of each of the double-row rolling element arrays 701 and 702 roll along a corresponding one of the raceway surfaces 71a and 71b. The first inner ring 72 has a raceway surface 72a. The rolling elements 70 of one array 701 out of the double-row rolling element arrays 701 and 702 roll along the raceway surface 72a. The second inner ring 73 has a raceway surface 73a. The rolling elements 70 of the other array 702 out of the double-row rolling element arrays 701 and 702 roll along the raceway surface 73a. The cage 74 retains the rolling elements 70 of the one array 701. The cage 75 retains the rolling elements 70 of the other array 702. The rolling elements 70 are balls, and are retained by the cages 74 and 75 such that the rolling elements 70 are rollable. Each of the rolling elements 70, the outer ring 71, the first inner ring 72, and the second inner ring 73 is made of bearing steel.

The rolling bearing 7 is a double-row angular contact (DAC) rolling bearing. A preload is applied to the first and second inner rings 72 and 73 by the snap ring 8. In FIG. 2, long dashed short dashed lines represent a line of contact between the rolling element 70 and each of the outer ring 71 and the first inner ring 72, and a line of contact between the rolling element 70 and each of the outer ring 71 and the second inner ring 73. The lines of contact are closer to each other (i.e., a distance between the lines of contact decreases) in a direction toward the outer ring 71 in a cross section including a rotation axis O of the ball screw nut 5 illustrated in FIG. 2.

The housing 3 includes a first member 31 and a second member 32 coupled with bolts 33. The outer ring 71 is fixed while being interposed between the first member 31 and the second member 32. One side face 71c of the outer ring 71 contacts an annular spacer 34, and the other side face 71d of the outer ring 71 contacts a stepped surface 31a formed on the first member 31. The spacer 34 is arranged between the one side face 71c of the outer ring 71 and an axial end face 32a of the second member 32. The one side face 71c of the outer ring 71 may contact the axial end face 32a of the second member 32 by extending the second member 32 in the axial direction. A spacer may be arranged between the stepped surface 31a of the first member 31 and the other side face 71d of the outer ring 71.

On the outer peripheral surface of the ball screw nut 5, a first outer peripheral fitting surface 5a and a second outer peripheral fitting surface 5b are formed in parallel to the rotation axis O by, for example, grinding. The first inner ring 72 is externally fitted to the first outer peripheral fitting surface 5a. The second inner ring 73 is externally fitted to the second outer peripheral fitting surface 5b. The receiving portion 52 of the ball screw nut 5 protrudes outward relative to the first outer peripheral fitting surface 5a. One side face 72b of the first inner ring 72 and one side face 73b of the second inner ring 73 face each other. A side face 52a of the receiving portion 52 contacts the other side face 72c of the first inner ring 72. The snap ring 8 contacts the other face 73c of the second inner ring 73. The second outer peripheral fitting surface 5b is formed closer to the recess 51 than the first outer peripheral fitting surface 5a is. The snap ring 8 contacts the face 73c of the second inner ring 73 to push the second inner ring 73 toward the first inner ring 72.

Figure 3A:
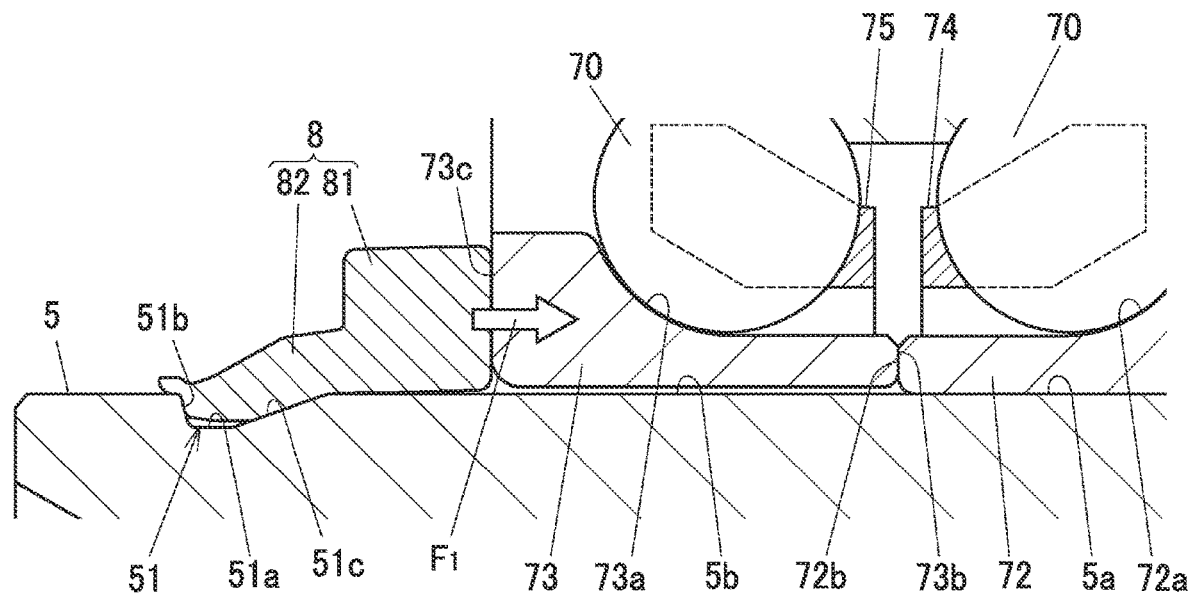
FIG. 3A is a partially enlarged view of FIG. 2.
Figure 3B:
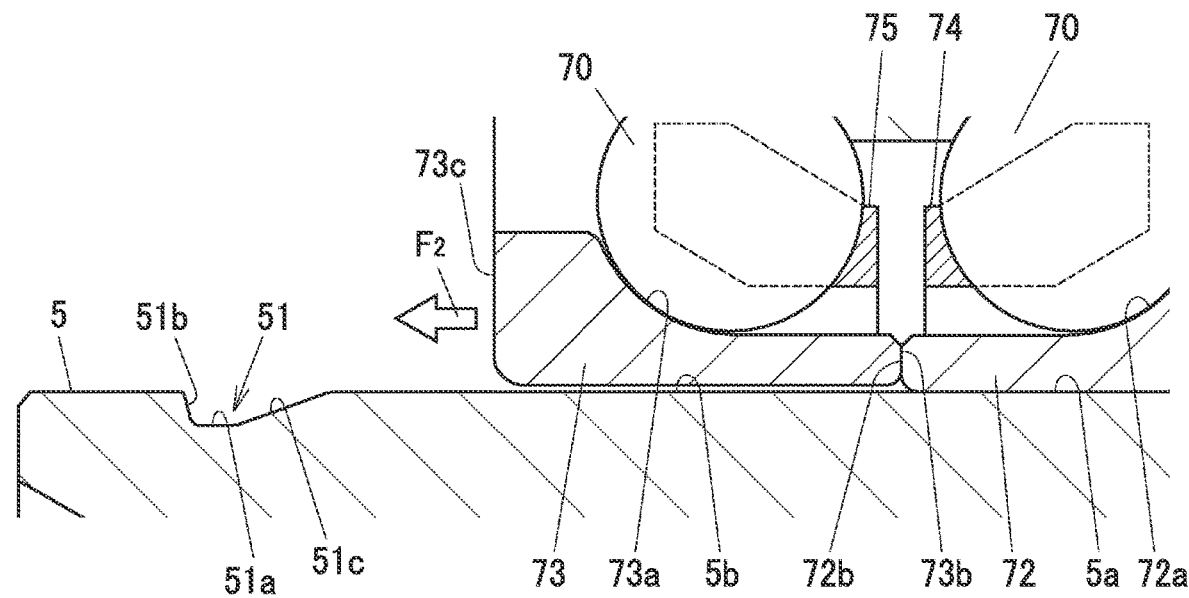
FIG. 3B is an explanatory drawing illustrating a state before a snap ring is attached in FIG. 3A.

FIG. 3A is a partially enlarged view of FIG. 2. FIG. 3B is an explanatory drawing illustrating a state before the snap ring 8 is attached in FIG. 3A. In this embodiment, the outside diameter of the first outer peripheral fitting surface 5a is equal to the outside diameter of the second outer peripheral fitting surface 5b, and the inside diameter of the second inner ring 73 is larger than the inside diameter of the first inner ring 72. The inside diameter difference is a minuscule dimension such as 20 to 30 μm. In FIG. 2 and FIG. 3A, the inside diameter difference is exaggerated for clear description.

Before the first inner ring 72 is externally fitted to the ball screw nut 5, the inside diameter of the first inner ring 72 is smaller than the outside diameter of the first outer peripheral fitting surface 5a. Therefore, the first inner ring 72 is fitted to the first outer peripheral fitting surface 5a by interference fit. The inside diameter of the second inner ring 73 is larger than the outside diameter of the second outer peripheral fitting surface 5b. Therefore, the second inner ring 73 is fitted to the second outer peripheral fitting surface 5b by clearance fit. The outside diameter of the first outer peripheral fitting surface 5a is equal to the outside diameter of the second outer peripheral fitting surface 5b.

The snap ring 8 is fixed to the ball screw nut 5 by being plastically deformed such that a part of the snap ring 8 enters the recess 51. The inner surface of the recess 51 includes a bottom surface 51a, an upward slope 51b, and a downward slope 51c. The bottom surface 51a is parallel to the rotation axis O. The downward slope 51c is located closer to the second outer peripheral fitting surface 5b than the bottom surface 51a is. The upward slope 51b is located on the opposite side of the bottom surface 51a from the second outer peripheral fitting surface 5b. The snap ring 8 is in contact with at least a part of each of the upward slope 51b and the downward slope 51c.

In FIG. 3A, an outline arrow represents a pushing force $F_1$ with which the snap ring 8 pushes the second inner ring 73. In FIG. 3B, an outline arrow represents a resistance force $F_2$ received from the second outer peripheral fitting surface 5b when the second inner ring 73 moves from the recess 51 toward the first inner ring 72 in the axial direction parallel to the rotation axis O in a state in which detachment of the rolling bearing 7 is not prevented by the snap ring 8. In this embodiment, the second inner ring 73 is fitted to the second outer peripheral fitting surface 5b by clearance fit, and therefore the pushing force $F_1$ is larger than the resistance force $F_2$. Even if the second inner ring 73 temporarily moves away from the first inner ring 72, the second inner ring 73 is pushed back toward the first inner ring 72 by the pushing force $F_1$ of the snap ring 8.

Figure 4A:
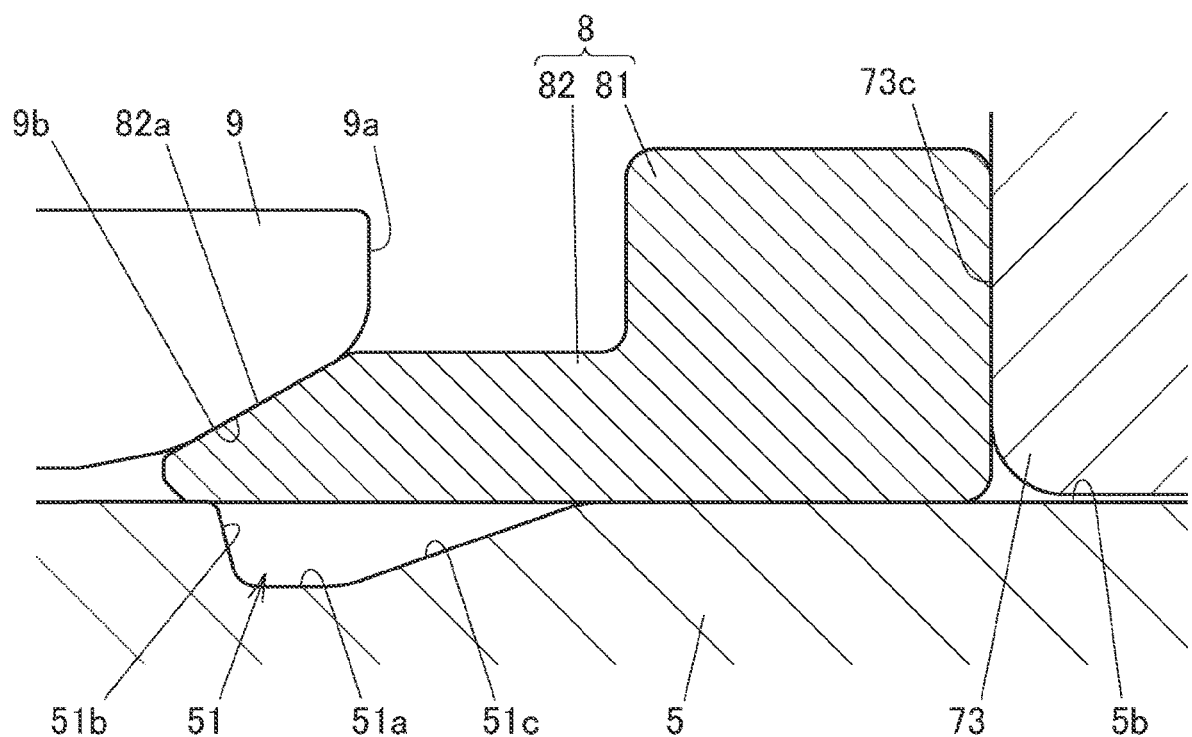
FIG. 4A is an explanatory drawing illustrating a state at the start of processing in a crimping step of crimping the snap ring.
Figure 4B:
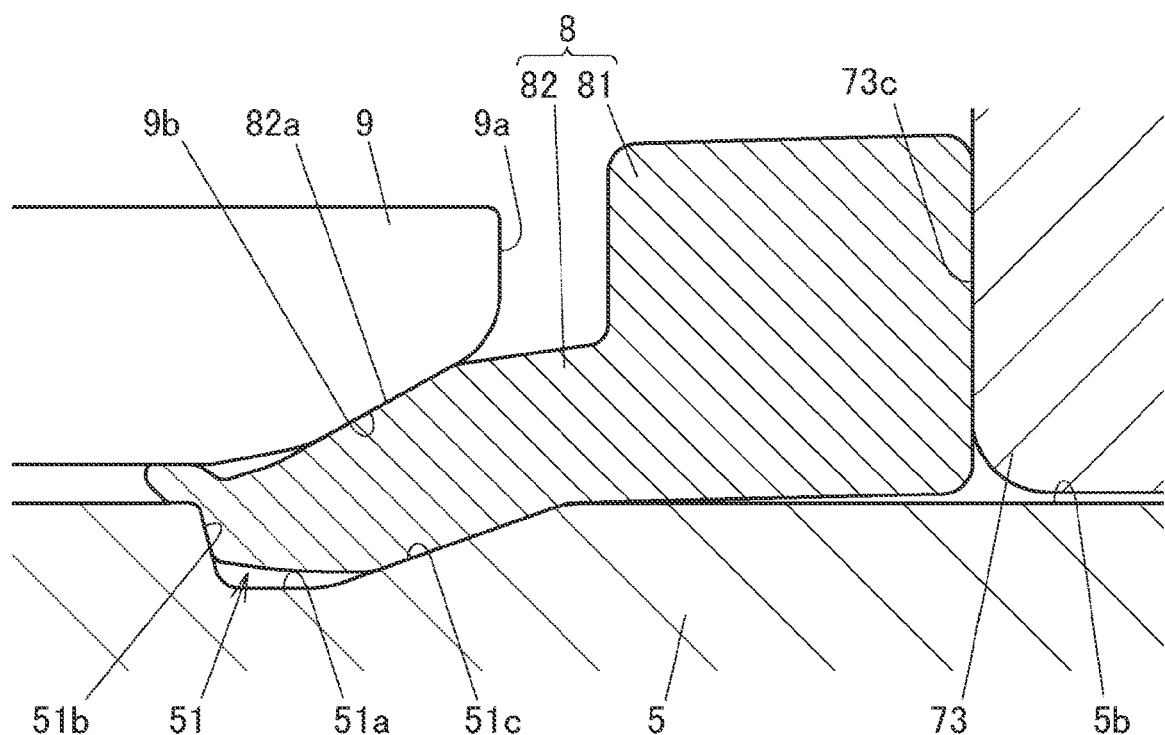
FIG. 4B is an explanatory drawing illustrating a state at the completion of processing in the crimping step of crimping the snap ring.

FIG. 4A and FIG. 4B are explanatory drawings illustrating a crimping step of crimping the snap ring 8 to fix the snap ring 8 to the ball screw nut 5. The snap ring 8 is crimped by moving a cylindrical crimping jig 9 toward the second inner ring 73 in parallel to the rotation axis O.

The crimping jig 9 has an inner peripheral tapered surface 9b, which is the inner peripheral surface of the end close to a distal end face 9a that is a front end face in a movement direction during crimping. Therefore, the diameter of the crimping jig 9 gradually increases toward the distal end face 9a. The snap ring 8 integrally has a contact portion 81 and an extending portion 82. The contact portion 81 has a rectangular sectional shape, and contacts the face 73c of the second inner ring 73. The extending portion 82 extends from the contact portion 81 away from the second inner ring 73 (i.e., the extending portion 82 extends from the contact portion 81 toward a side opposite to the second inner ring 73). The outer peripheral surface of the end of the extending portion 82 that is opposite to the contact portion 81 is an outer peripheral tapered surface 82a whose outside diameter gradually decreases in a direction away from the contact portion 81. The snap ring 8 is made of an iron-based metal that is softer and plastically deformed more easily than the second inner ring 73 and the ball screw nut 5.

In the crimping step, as illustrated in FIG. 4A, the inner peripheral tapered surface 9b of the crimping jig 9 contacts the outer peripheral tapered surface 82a of the snap ring 8, and the crimping jig 9 moves toward the second inner ring 73. FIG. 4B illustrates a state in which the crimping of the snap ring 8 is completed. In this process, a part of the extending portion 82 is plastically deformed so as to enter the recess 51, and the snap ring 8 is fixed to the ball screw nut 5. The snap ring 8 is pressed against the second inner ring 73 while the plastically deformed part of the snap ring 8 is in contact with the downward slope 51c, and thus, the snap ring 8 generates the pushing force $F_1$.

Figure 5A:
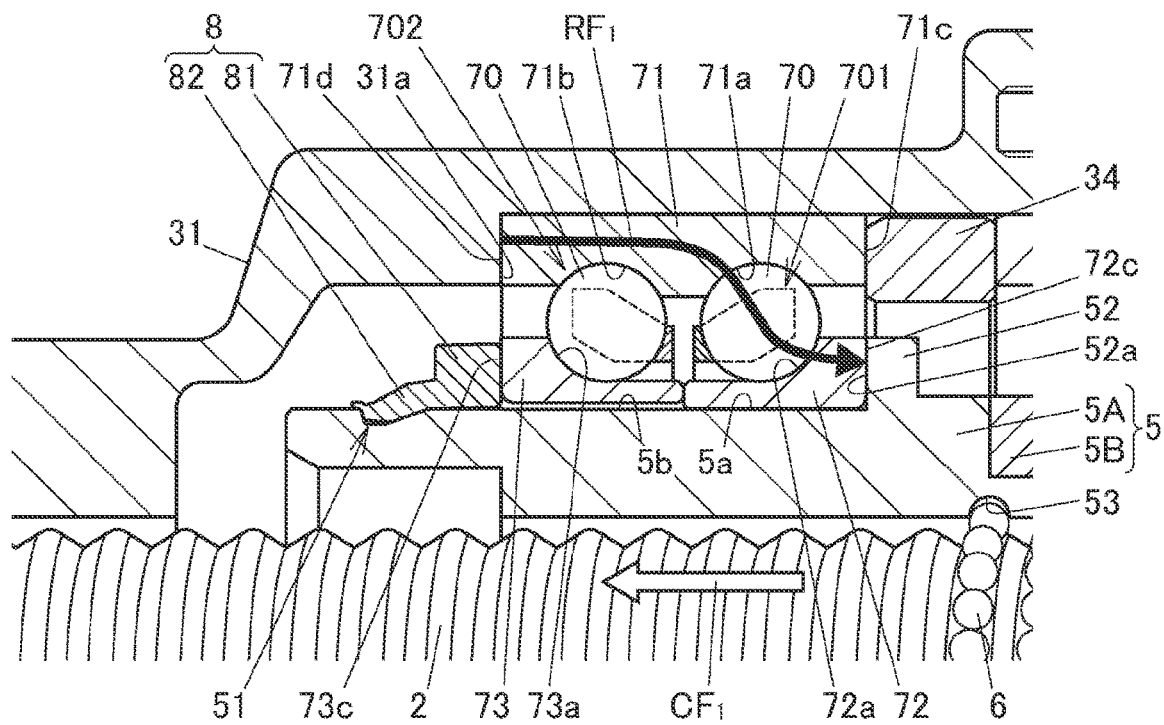
FIG. 5A is an explanatory drawing illustrating a state in which a reverse input is applied from a left side of a vehicle to a right side of the vehicle.
Figure 5B:
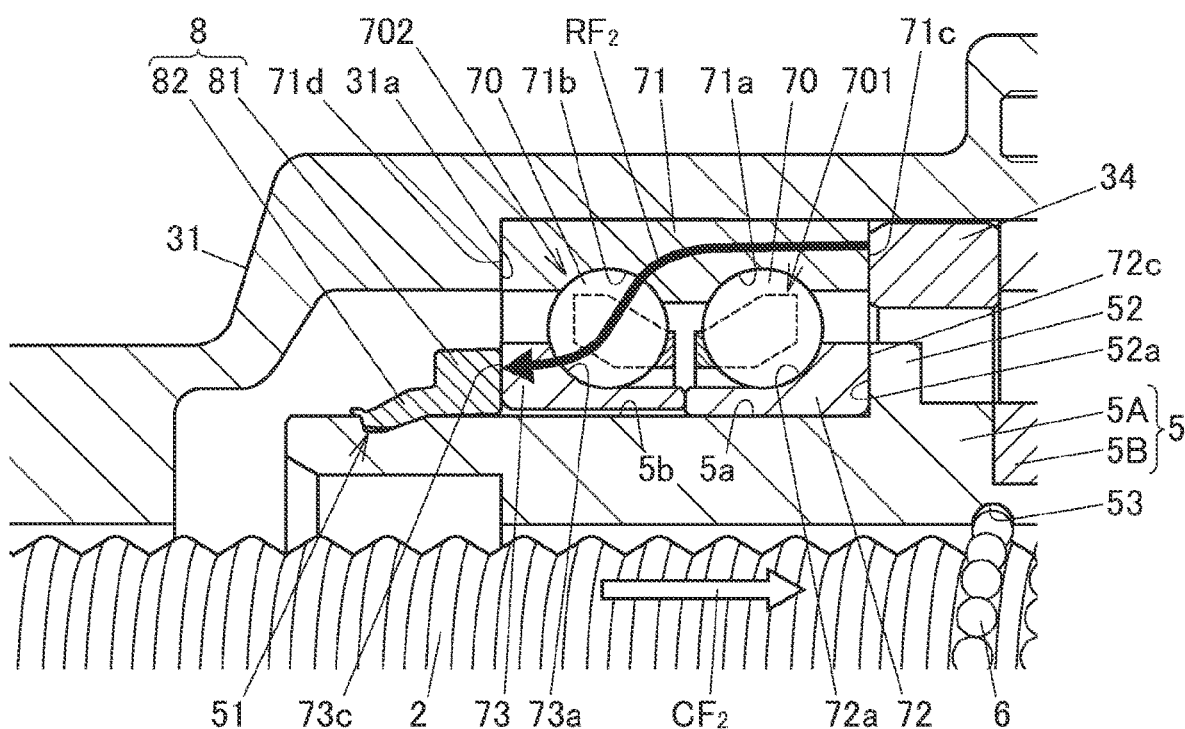
FIG. 5B is an explanatory drawing illustrating a state in which a reverse input is applied from the right side of the vehicle to the left side of the vehicle.

For example, when the steered wheel (front wheel) of the vehicle runs onto a curbstone while the vehicle is traveling, a reverse input is applied from the steered wheel to the rack shaft 2. FIG. 5A illustrates a state in which the reverse input is applied from the left side of the vehicle to the right side of the vehicle. FIG. 5B illustrates a state in which the reverse input is applied from the right side of the vehicle to the left side of the vehicle.

When a reverse input $CF_1$ is applied from the left side of the vehicle to the right side of the vehicle as illustrated in FIG. 5A, the reverse input $CF_1$ is transmitted to the rolling bearing 7 via the balls 6 and the ball screw nut 5. The rolling bearing 7 receives a reaction force $RF_1$ against the reverse input $CF_1$, from the side face 71d of the outer ring 71 in contact with the stepped surface 31a of the housing 3. The reaction force $RF_1$ is transmitted to the rolling elements 70 from the raceway surface 71a of the outer ring 71, and is further transmitted to the raceway surface 72a of the first inner ring 72 from the rolling elements 70. The reaction force $RF_1$ transmitted to the first inner ring 72 is received by the receiving portion 52 of the ball screw nut 5. At this time, axial movement of the first inner ring 72 relative to the ball screw nut 5 due to the reaction force $RF_1$ is restricted when the side face 72c of the first inner ring 72 contacts the side face 52a of the receiving portion 52.

When a reverse input $CF_2$ is applied from the right side of the vehicle to the left side of the vehicle as illustrated in FIG. 5B, the reverse input $CF_2$ is transmitted to the rolling bearing 7 via the balls 6, the ball screw nut 5, and the snap ring 8. In the rolling bearing 7, the side face 71c of the outer ring 71 receives a reaction force $RF_2$ against the reverse input $CF_2$, from the spacer 34. The reaction force $RF_2$ is transmitted to the rolling elements 70 from the raceway surface 71b of the outer ring 71, and is further transmitted to the raceway surface 73a of the second inner ring 73 from the rolling elements 70. The reaction force $RF_2$ transmitted to the second inner ring 73 is received by the snap ring 8. Depending on the magnitude of the reaction force $RF_2$, the snap ring 8 is elastically deformed so as to be compressed in the axial direction, and the second inner ring 73 moves away from the first inner ring 72.

If the second inner ring 73 does not return to the original position after the movement, internal gaps of the rolling bearing 7 (gaps between the raceway surface 71b of the outer ring 71 and the rolling elements 70 and between the raceway surface 73a of the second inner ring 73 and the rolling elements 70) are generated, and the preload is released. In this state, abnormal noise is likely to occur due to rattling (in other words, backlash) of the ball screw nut 5 in the housing 3.

Figure 6:
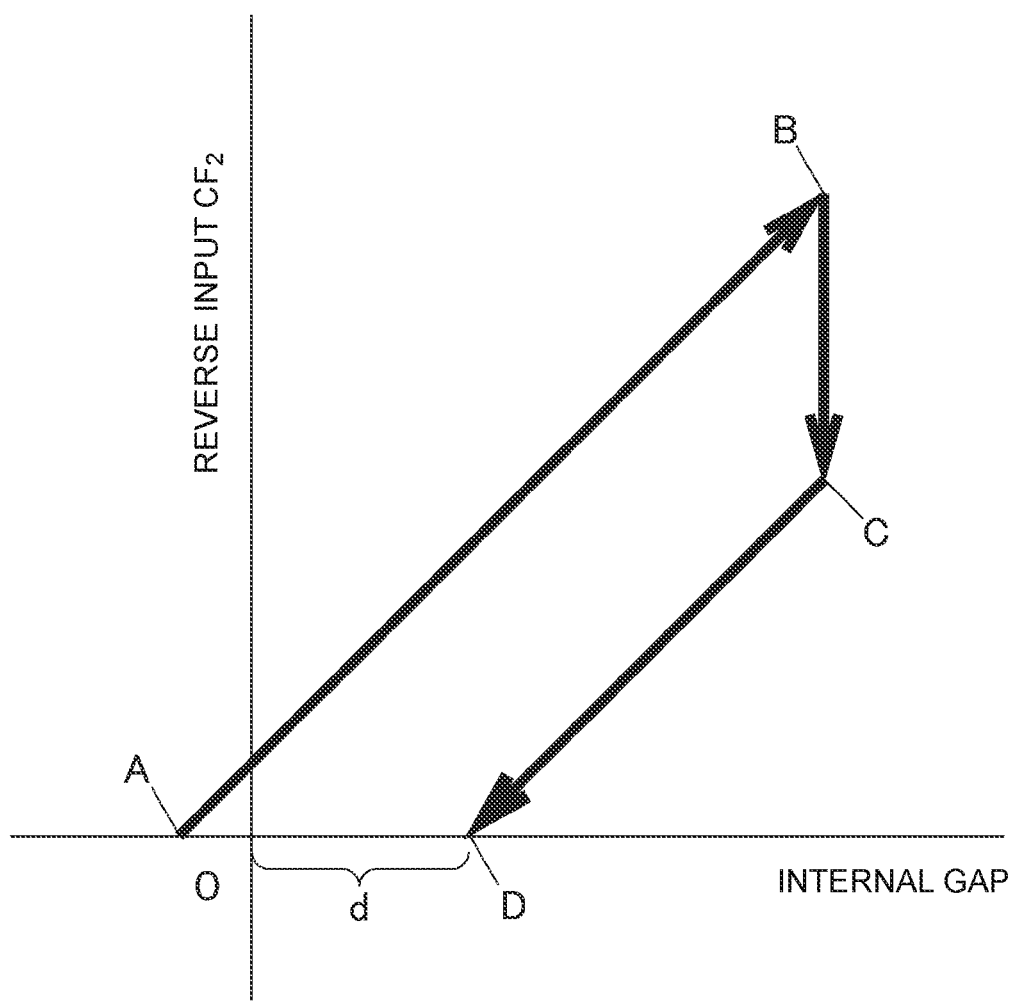
FIG. 6 is a graph for explaining a phenomenon in which a preload of a rolling bearing is released if a second inner ring is fitted to a second outer peripheral fitting surface by interference fit.

FIG. 6 is a graph for explaining a phenomenon in which the preload of the rolling bearing 7 is released if the second inner ring 73 is fitted to the second outer peripheral fitting surface 5b by interference fit. In this graph, the horizontal axis represents the internal gap of the rolling bearing 7, and the vertical axis represents the magnitude of the reverse input $CF_2$. In an initial state indicated by a coordinate point A of the graph, the reverse input $CF_2$ is zero, and the internal gap of the rolling bearing 7 is a negative gap. When the reverse input $CF_2$ increases in the initial state, the internal gap of the rolling bearing 7 becomes a positive gap, and increases along with the increase in the reverse input $CF_2$. In FIG. 6, a coordinate point B indicates coordinates when the reverse input $CF_2$ is the maximum value of this graph.

When the reverse input $CF_2$ decreases in this state, the internal gap of the rolling bearing 7 does not change for a while due to a friction force between the inner peripheral surface of the second inner ring 73 and the second outer peripheral fitting surface 5b. This state is indicated by a coordinate point C. When the reverse input $CF_2$ further decreases later, the internal gap of the rolling bearing 7 is gradually reduced by the pushing force $F_1$ of the snap ring 8. In FIG. 6, a coordinate point D indicates a state in which the reverse input $CF_2$ is zero. In this state, the internal gap of the rolling bearing 7 remains a positive gap because the second inner ring 73 does not return to a position where the internal gap is a negative gap due to the friction force between the inner peripheral surface of the second inner ring 73 and the second outer peripheral fitting surface 5b. Thus, a positive gap having a size represented by d on the horizontal axis is generated.

In this embodiment, however, the pushing force $F_1$ with which the snap ring 8 pushes the second inner ring 73 is larger than the resistance force $F_2$ received by the second inner ring 73 from the second outer peripheral fitting surface 5b as described above. Therefore, when the reverse input $CF_2$ returns to zero, the second inner ring 73 returns to the position in the initial state indicated by the coordinate point A. Thus, the internal gap of the rolling bearing 7 becomes a negative gap. Accordingly, it is possible to reduce the rattling (backlash) of the ball screw nut 5 in the housing 3, and therefore it is possible to reduce the occurrence of abnormal noise.

Figure 7:
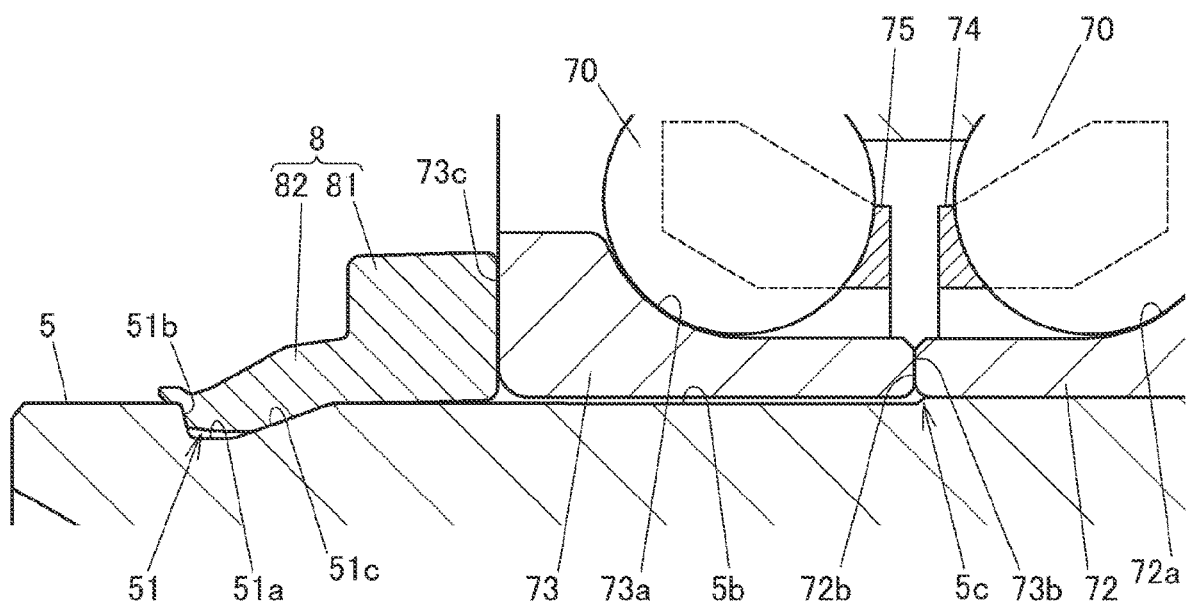
FIG. 7 is a partially enlarged sectional view illustrating a steering system according to a second embodiment of the present disclosure.

Next, a second embodiment of the present disclosure is described with reference to FIG. 7. FIG. 7 is a partially enlarged sectional view illustrating a steering system according to the second embodiment. The second embodiment is similar to the first embodiment except that the inside diameter of the second inner ring 73 and the outside diameter of the second outer peripheral fitting surface 5b differ from those in the first embodiment. Therefore, the difference is mainly described. In FIG. 7, components corresponding to those described in the first embodiment are represented by the same reference symbols as those in FIG. 3A and the like to omit redundant description.

In the first embodiment, the outside diameter of the first outer peripheral fitting surface 5a is equal to the outside diameter of the second outer peripheral fitting surface 5b, and the inside diameter of the second inner ring 73 is larger than the inside diameter of the first inner ring 72. In the second embodiment, the outside diameter of the second outer peripheral fitting surface 5b is smaller than the outside diameter of the first outer peripheral fitting surface 5a, and the inside diameter of the first inner ring 72 is equal to the inside diameter of the second inner ring 73. For example, the difference between the outside diameter of the first outer peripheral fitting surface 5a and the outside diameter of the second outer peripheral fitting surface 5b is 20 to 30 μm. A stepped portion 5c is formed between the first outer peripheral fitting surface 5a and the second outer peripheral fitting surface 5b. In FIG. 7, the outside diameter difference is exaggerated for clear description.

With this structure, in the second embodiment as well as the first embodiment, the pushing force with which the snap ring 8 pushes the second inner ring 73 is larger than the resistance force received from the second outer peripheral fitting surface 5b when the second inner ring 73 moves in the axial direction in the state in which detachment of the rolling bearing 7 is not prevented by the snap ring 8. Therefore, effects similar to those of the first embodiment are obtained in the second embodiment. Further, the first inner ring 72 and the second inner ring 73 have the same dimensions. Therefore, common components can be used, and erroneous attachment can be prevented.

Although the present disclosure has been described above based on the embodiments, the present disclosure is not limited to the embodiments. It should be noted that not all combinations of the features described in the embodiments are essential for the solution of the disclosure to the problem.

The present disclosure may be modified as appropriate without departing from the scope of the present disclosure. For example, in the embodiments described above, the rolling bearing 7 includes the plurality of rolling elements (balls) 70 having a spherical shape. The present disclosure is not limited to this configuration. For example, the plurality of rolling elements may have a partially conical shape. In this case, the rolling bearing 7 is a tapered roller bearing.

In the embodiment described above, description is provided on the case where the inside diameter of the second inner ring 73 is larger than the outside diameter of the second outer peripheral fitting surface 5b. If the relationship of $F_1 > F_2$ is satisfied, the inside diameter of the second inner ring 73 may be substantially equal to the outside diameter of the second outer peripheral fitting surface 5b. In the embodiments described above, description is provided on the case where the first inner ring 72 is fitted to the first outer peripheral fitting surface 5a by interference fit. The present disclosure is not limited to this case. The first inner ring 72 may be fitted to the first outer peripheral fitting surface 5a by clearance fit. The interference fit of the first inner ring 72 to the first outer peripheral fitting surface 5a is more desirable because the support stiffness of the rolling bearing 7 supporting the ball screw nut 5 increases.

In the embodiments described above, description is provided on the case where the driver steers the steering wheel 10 to move the rack shaft 2 in the axial direction, thereby turning the steered wheels. The present disclosure is not limited to this case. The present disclosure is also applicable to a self-driving vehicle (i.e., autonomous vehicle) configured such that the rack shaft 2 moves in the axial direction through the rotation of the ball screw nut 5 even if the driver does not steer the steering wheel 10.

Figure 8:
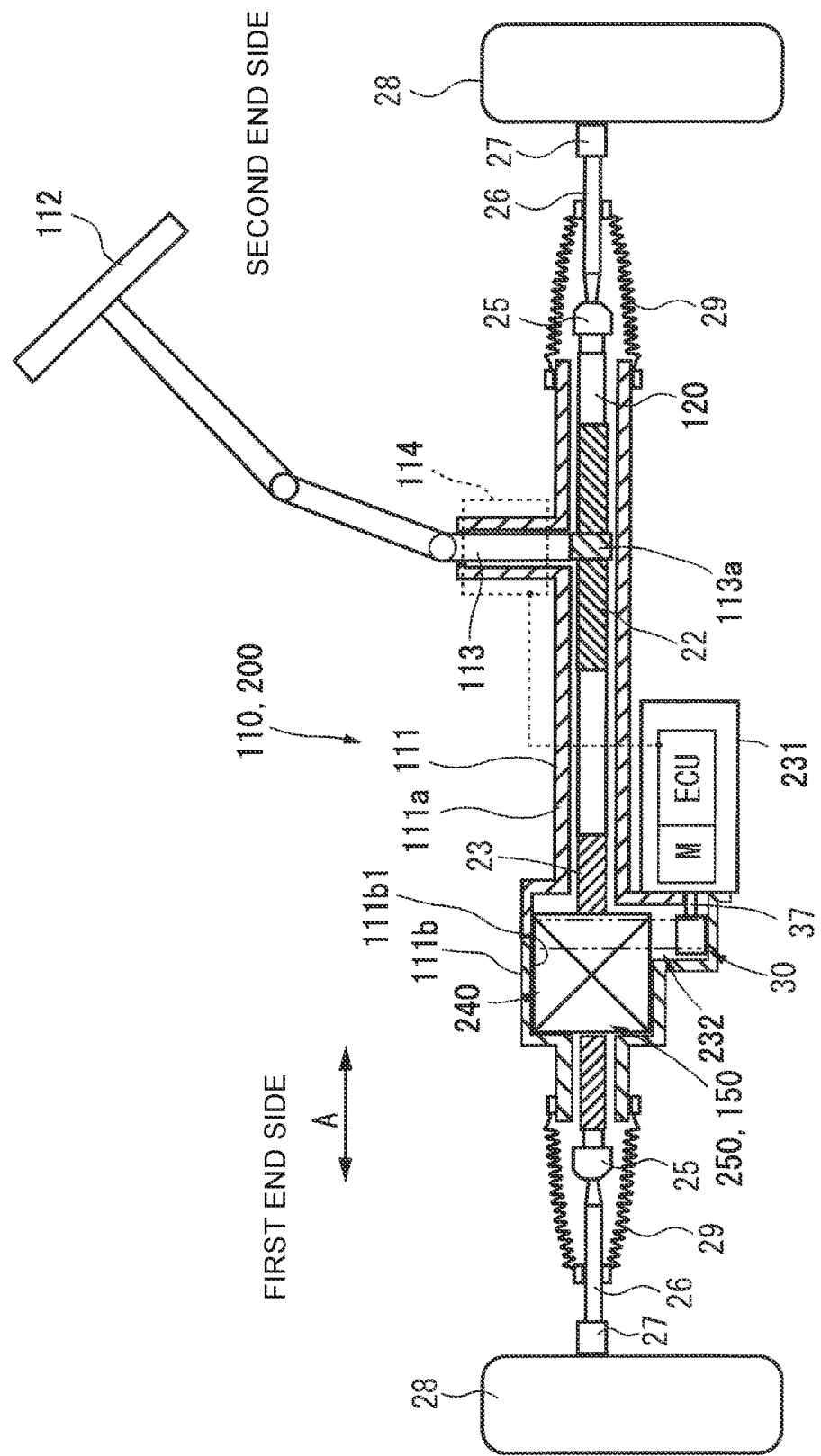
FIG. 8 is a schematic diagram illustrating an electric power steering system according to third and fourth embodiments of the present disclosure.

An electric power steering system to which a support unit according to a third embodiment of the present disclosure is applied is described below with reference to the drawings. FIG. 8 is a diagram illustrating the overall electric power steering system (corresponding to the steering system). The electric power steering system assists a steering force by using a steering assist force.

An electric power steering system 110 (hereinafter referred to simply as a steering system 110) turns steered wheels 28 of a vehicle by causing a shaft 120 to relatively reciprocate in a direction A (lateral direction in FIG. 8) that coincides with an axial direction of the shaft 120. Opposite ends of the shaft 120 are coupled to the steered wheels 28 via link mechanisms (not illustrated). In FIG. 8, the left side is a first end side, and the right side is a second end side.

As illustrated in FIG. 8, the steering system 110 includes a housing 111, a steering wheel 112, a steering shaft 113, a torque detector 114, an electric motor M (corresponding to a motor; hereinafter referred to simply as a motor M), the shaft 120, a steering assist apparatus 30 (corresponding to a driving force application apparatus), a ball screw apparatus 240, and a support unit 250.

The housing 111 is a fixed member that is fixed to the vehicle. The housing 111 is formed into a tubular shape, and supports the shaft 120 such that the shaft 120 is inserted through the housing 111 so as to be able to reciprocate in the direction A. The housing 111 includes a first housing 111a, and a second housing 111b fixed to the first end side (left side in FIG. 8) in the first housing 111a in the direction A.

The steering wheel 112 is fixed to the end of the steering shaft 113, and is supported in a vehicle cabin so as to be rotatable about an axis of the steering shaft 113. The steering shaft 113 transmits, to the shaft 120, a torque applied to the steering wheel 112 through a driver's operation.

A pinion 113a of a rack and pinion mechanism is formed at the end of the steering shaft 113, the end being close to the shaft 120. The torque detector 114 detects a torque applied to the steering shaft 113 based on the torsion amount of the steering shaft 113.

The shaft 120 extends in the direction A. A rack 22 is formed on the outer peripheral surface of the shaft 120. The rack 22 meshes with the pinion 113a of the steering shaft 113 to form the rack and pinion mechanism together with the pinion 113a. The shaft 120 includes joints 25 at opposite ends. The joints 25 form a part of the link mechanisms. Tie rods 26 are coupled to the ends of the joints 25, respectively. The distal ends of the tie rods 26 are coupled to the right and left steered wheels 28 via knuckle arms 27.

When the steering wheel 112 is steered, the shaft 120 is caused to reciprocate linearly via the rack and pinion mechanism. The steered wheels 28 are turned when the movement of the shaft 120 along the direction A is transmitted to the knuckle arms 27 via the tie rods 26. Thus, the traveling direction of the vehicle is changed.

One end of each of boots 29 is fixed to a corresponding one of opposite ends of the housing 111 in the direction A. For example, the boots 29 are made of resin, mainly cover joint portions between the joints 25 and the tie rods 26, and have tubular bellows extensible and contractible in the direction A. The other end of each of the boots 29 is fixed to a corresponding one of the tie rods 26. The boots 29 restrain entry of foreign matter such as dust or water into the housing 111 and the joints 25.

The shaft 120 has an outer peripheral rolling groove 23 formed on its outer peripheral surface at a position different from the position of the rack 22. The outer peripheral rolling groove 23 forms the ball screw apparatus 240 together with an inner peripheral rolling groove 121a formed on the inner peripheral surface of a nut 121 described later. The steering assist apparatus 30 (driving force application apparatus) transmits the steering assist force.

The steering assist apparatus 30 applies an axial driving force to the shaft 120 as the steering assist force, by rotating the nut 121 using the motor M fixed to the housing 111 as a drive source. The steering assist apparatus 30 includes the motor M, a controller ECU, and a driving force transmission mechanism 232. The controller ECU drives the motor M. The motor M and the controller ECU configured to drive the motor M are fixed to and housed in a case 231 fixed to the first housing 111a of the housing 111. The controller ECU determines a steering assist torque and controls power output from the motor M based on an output signal from the torque detector 114.

Figure 9:
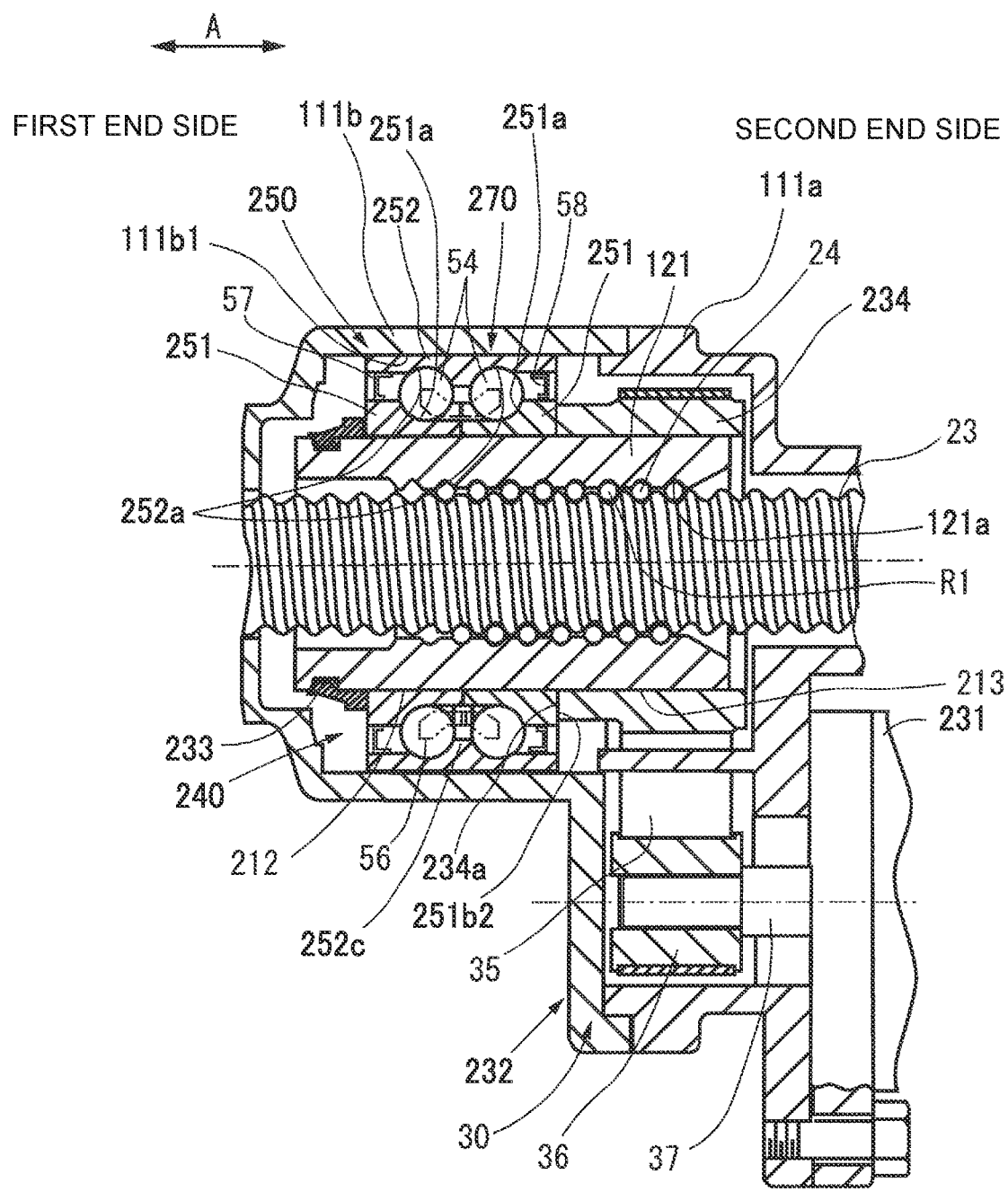
FIG. 9 is a partially enlarged sectional view illustrating a ball screw apparatus and a support unit according to the third embodiment.

As illustrated in FIG. 9, the driving force transmission mechanism 232 includes a driving pulley 36, a driven pulley 234, and a toothed belt 35. Each of the driving pulley 36 and the driven pulley 234 is a toothed pulley having helical external teeth. The toothed belt 35 is a ring-shaped rubber belt having a plurality of helical internal teeth provided on its inner periphery.

The driving pulley 36 is provided at the distal end of an output shaft 37 of the motor M so as to be rotatable together with (i.e., integrally with) the output shaft 37. The output shaft 37 is arranged in parallel to an axis of the shaft 120 with a predetermined amount of offset (in other words, the output shaft 37 is offset from the axis of the shaft 120 by a predetermined amount). The predetermined offset amount may be set to any amount.

The driven pulley 234 is coupled to the driving pulley 36 via the toothed belt 35, and is provided on the outer periphery of a driven pulley support portion 213 at the second end side in the nut 121 described later (see FIG. 9) so that the driven pulley 234 is rotatable together with (i.e., integrally with) the nut 121. The toothed belt 35 is wound between the outer periphery of the driven pulley 234 and the outer periphery of the driving pulley 36 while meshing with the helical teeth provided on the outer peripheries.

Thus, the driving force transmission mechanism 232 transmits a rotational driving force (driving force) between the driving pulley 36 and the driven pulley 234. That is, the driving force transmission mechanism 232 transmits the rotational driving force from the motor M to the nut 121 via the driven pulley 234. A bearing support portion 212 is provided on the outer peripheral surface of the nut 121 at a position at the first end side (left side in FIG. 9) in the direction A (axial direction). The bearing support portion 212 supports inner rings of a double-row angular contact ball bearing 270 described later. An outer ring of the double-row angular contact ball bearing 270 is supported on an inner peripheral surface 111b1 of the second housing 111b such that the outer ring is relatively rotatable. Thus, the nut 121 is supported so as to be rotatable relative to the second housing 111b.

As illustrated in FIG. 9, the ball screw apparatus 240 includes the outer peripheral rolling groove 23, the tubular nut 121, the inner peripheral rolling groove 121a, a plurality of rolling balls 24 (corresponding to rolling elements), and deflectors (not illustrated). The outer peripheral rolling groove 23 is formed on the outer peripheral surface of the shaft 120. The nut 121 is arranged radially outward of the outer peripheral rolling groove 23. The inner peripheral rolling groove 121a is formed on the inner peripheral surface of the nut 121. The rolling balls 24 roll between the outer peripheral rolling groove 23 and the inner peripheral rolling groove 121a. The ball screw apparatus 240 is arranged between the steering assist apparatus 30 and the shaft 120 in a driving force transmission path, and transmits the driving force to the shaft 120.

The outer peripheral rolling groove 23 and the inner peripheral rolling groove 121a of the nut 121 face each other to form a ball rolling path R1 where the rolling balls 24 roll between the outer peripheral rolling groove 23 and the inner peripheral rolling groove 121a. The rolling balls 24 are arranged in the ball rolling path R1 in a rollable manner. Thus, the outer peripheral rolling groove 23 and the inner peripheral rolling groove 121a engage with each other via the rolling balls 24.

The rolling balls 24 that roll along the ball rolling path R1 endlessly circulate via the deflectors (not illustrated) arranged in the nut 121 and a path (not illustrated) formed in the nut 121 and connecting the deflectors. The endless circulation of the rolling balls 24 using the deflectors is a publicly-known technology, and therefore detailed description is omitted.

With the structure described above, the steering assist apparatus 30 drives the motor M based on a rotational operation (steering) for the steering wheel 112 to rotate the output shaft 37 of the motor M and the driving pulley 36. The rotation of the driving pulley 36 is transmitted to the driven pulley 234 via the toothed belt 35, and the driven pulley 234 rotates. Accordingly, the nut 121 integrally provided on the driven pulley 234 rotates. Through the rotation of the nut 121, the steering assist force (corresponding to the driving force) in the axial direction of the shaft 120 is transmitted to the shaft 120 via the rolling balls 24 of the ball screw apparatus 240. Thus, the shaft 120 is moved in the axial direction relative to the housing 111.

Next, the support unit 250 is described with reference to FIG. 10. The support unit 250 supports the nut 121 so that the nut 121 is rotatable relative to the housing 111. The support unit 250 includes an annular groove 233, the bearing support portion 212, the double-row angular contact ball bearing 270 (corresponding to the rolling bearing), a retainer 80, and a clearance member 90. For example, the nut 121 is made of SCM430 (Japanese Industrial Standards (JIS)).

Figure 10:
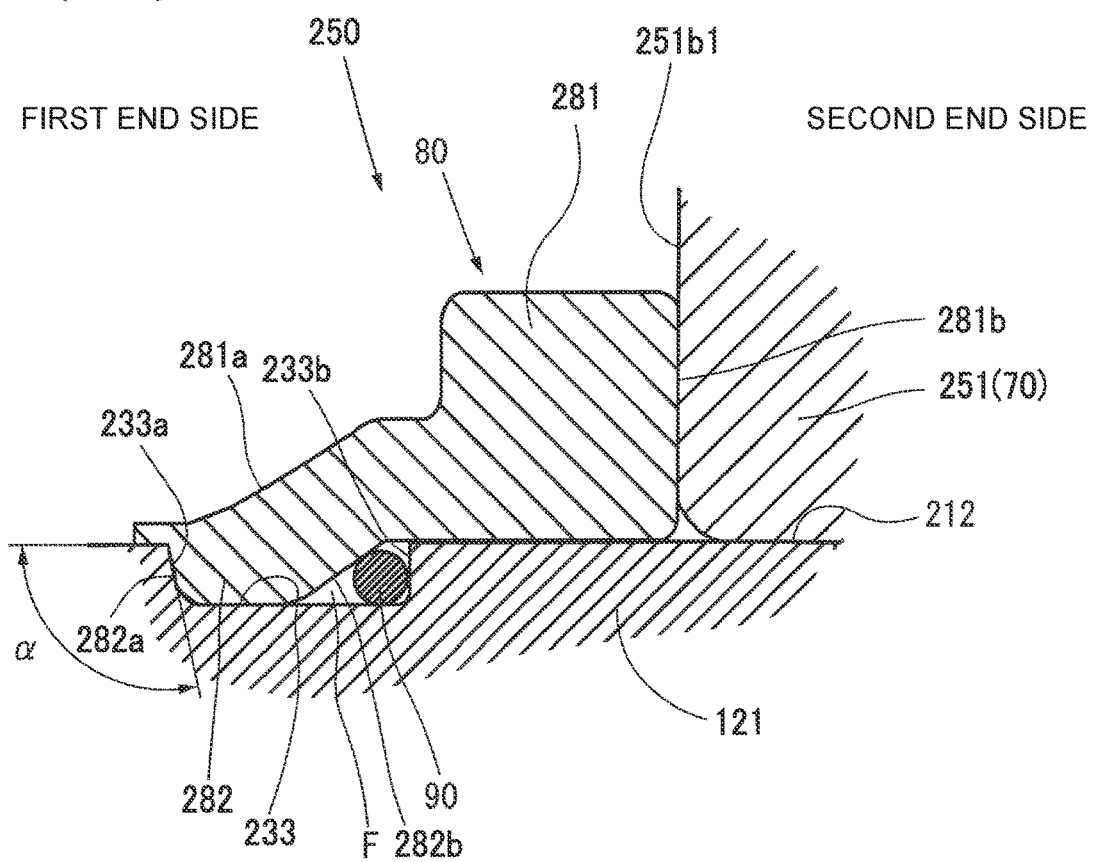
FIG. 10 is an enlarged view of the support unit of FIG. 9.
Figure 11:
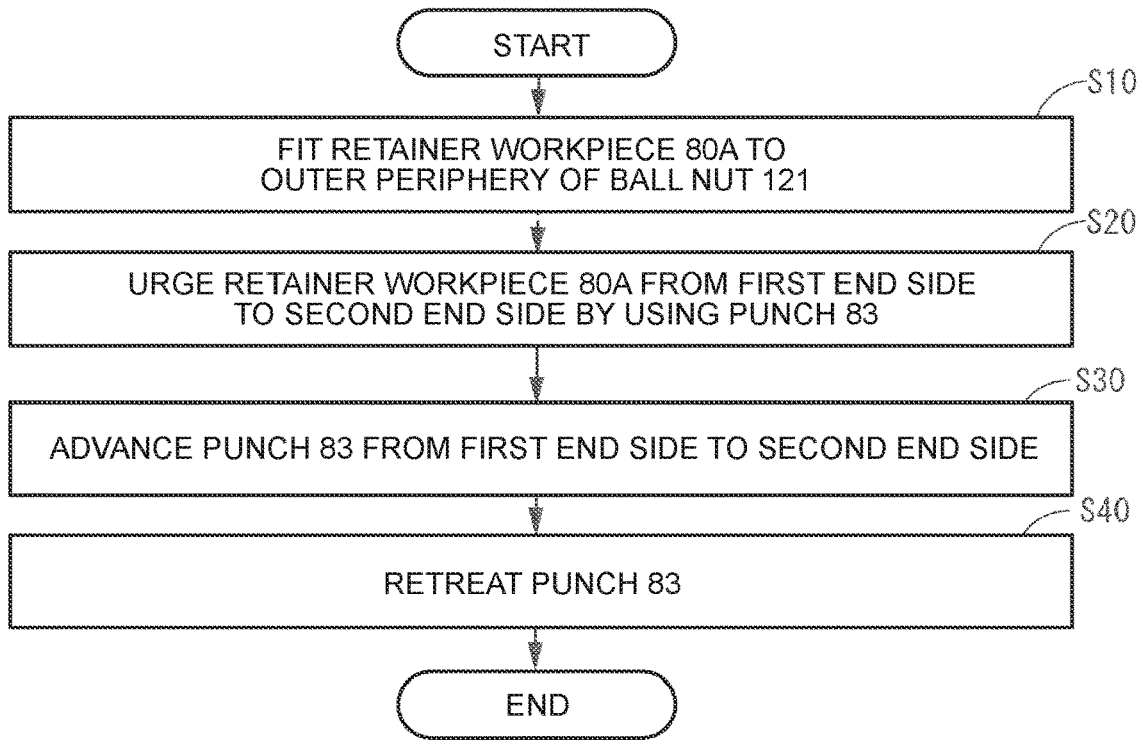
FIG. 11 is a flowchart illustrating a procedure for attaching the support unit.

As illustrated in FIG. 10, the annular groove 233 is formed on the outer peripheral surface of the nut 121 at a position closer to the first end side in the axial direction than the bearing support portion 212 is. The annular groove 233 has a first groove side face 233a at the first end side and a second groove side face 233b at the second end side. The first groove side face 233a and the second groove side face 233b are formed to extend in a circumferential direction of the outer peripheral surface of the nut 121 and face each other in the axial direction in the annular groove 233. As illustrated in FIG. 10, in this embodiment, it is preferable that an inclination angle α formed between the first groove side face 233a of the annular groove 233 and a portion of the outer peripheral surface of the nut 121 should be slightly larger than 90 degrees, the portion of the outer peripheral surface of the nut 121 being located closer to the first end side than the annular groove 233 is. The inclination angle α may be set to any angle.

As illustrated in FIG. 9 and FIG. 10, the double-row angular contact ball bearing 270 (rolling bearing) is arranged, in the radial direction, between the inner peripheral surface 111b1 of the second housing 111b and the bearing support portion 212 at the first end side (left side in FIG. 9) in the nut 121 in the direction A as described above. Thus, the double-row angular contact ball bearing 270 supports the nut 121 so that the nut 121 is rotatable relative to the second housing 111b (housing 111).

As illustrated in FIG. 9 and FIG. 10, the double-row angular contact ball bearing 270 is arranged, in the direction A, adjacent to the driven pulley 234 arranged on the driven pulley support portion 213 at the second end side in the nut 121. Specifically, an end face 234a at the first end side in the driven pulley 234 contacts a second inner ring end face 251*b*2 at the second end side in an inner ring 251 as described later. The inner ring 251 is provided at the second end side in the double-row angular contact ball bearing 270. Thus, movement of the double-row angular contact ball bearing 270 to the second end side is restricted.

As illustrated in FIG. 9, the double-row angular contact ball bearing 270 includes inner rings 251, an outer ring 252, a plurality of bearing balls 54, a cage 56, a first seal member 57, and a second seal member 58. The bearing balls 54 are housed between raceway surfaces 251*a* formed on the outer peripheral surfaces of the inner rings 251 and raceway surfaces 252*a* formed on the inner peripheral surface of the outer ring 252. The cage 56 and the first and second seal members 57 and 58 may be similar to a cage and seal members for use in general angular contact ball bearings, and therefore detailed description is omitted.

As illustrated in FIG. 10, the inner ring 251 at the first end side has a first inner ring end face 251*b*1 on the side of the annular groove 233 (i.e., the first inner ring end face 251*b*1 is located at the first end side). For example, the inner ring 251 is made of SCM430 (JIS) similarly to the nut 121. As illustrated in FIG. 9, the outer ring 252 is a tubular member. The outer ring 252 is arranged on the inner periphery of the second housing 111*b* (housing 111) so that the inner peripheral surface 111*b*1 of the second housing 111*b* faces the outer peripheral surface of the outer ring 252. As illustrated in FIG. 9, a protrusion 252*c* that protrudes radially inward is formed at the substantially center of the inner peripheral surface of the outer ring 252 in the direction A (axial direction).

The raceway surface 252*a* at the first end side in the outer ring 252 is formed by the inner peripheral surface at the first end side (left side) in the outer ring 252 and the side face of the protrusion 252*c* (left side face in FIG. 9). The raceway surface 252*a* at the second end side is formed by the inner peripheral surface at the second end side (right side) in the outer ring 252 and the side face of the protrusion 252*c* (right side face in FIG. 9). In this embodiment, the raceway surfaces 252*a* face toward opposite sides in the direction A (axial direction).

As illustrated in FIG. 9, the sectional shape (radius R; not illustrated) of each of the raceway surfaces 252*a* substantially conforms to the shape (radius R) of a part of an outer peripheral line in a section of the bearing ball 54 taken along a plane passing through the central point. Both the raceway surfaces 252*a* are angular contact grooves. The raceway surfaces 251*a* of the inner rings 251 are angular contact grooves formed so as to face the raceway surfaces 252*a* of the outer ring 252.

In the double-row angular contact ball bearing 270, a preload is applied to the inner rings 251 in a thrust direction to eliminate internal gaps between the bearing balls 54 and the raceway surfaces 252*a* of the outer ring 252 and between the bearing balls 54 and the raceway surfaces 251*a* of the inner rings 251. Thus, a high support rigidity can be attained.

As illustrated in FIG. 10, the retainer 80 includes an inner ring contact portion 281, and an entry portion 282 arranged in the annular groove 233. For example, the retainer 80 is made of S15C, SPCC, or SPCD (JIS). The entry portion 282 is a portion of the retainer 80 that is arranged on an outer part of the annular groove 233. The entry portion 282 extends with an inclination relative to an axis from the entry portion 282 in the annular groove 233 to the second end side and an outer side in the radial direction of the nut 121.

That is, the entry portion 282 has a tapered surface 281*a* on its outer peripheral surface. The inner ring contact portion 281 has an inner ring contact portion end face 281*b* provided at the second end side (i.e., the inner ring contact portion end face 281*b* provided on the side of the double-row angular contact ball bearing 270). The inner ring contact portion 281 is arranged so that the inner ring contact portion end face 281*b* contacts the first inner ring end face 251*b*1 of the inner ring 251 at the first end side in the double-row angular contact ball bearing 270.

As described above, the entry portion 282 is a portion of the retainer 80 that enters the annular groove 233. The entry portion 282 is integrally connected to the inner ring contact portion 281. The entry portion 282 has a first entry portion end face 282*a* that contacts the first groove side face 233*a* of the annular groove 233 in a state in which the first inner ring end face 251*b*1 of the inner ring 251 contacts the inner ring contact portion end face 281*b* of the inner ring contact portion 281 of the retainer 80. The first entry portion end face 282*a* is formed at an angle corresponding to the inclination angle α of the first groove side face 233*a* of the annular groove 233, and contacts the first groove side face 233*a*.

The entry portion 282 has a second entry portion end face 282*b* that faces the second groove side face 233*b* of the annular groove 233 via a predetermined clearance F. The size of the predetermined clearance conforms to the size of the clearance member 90 described later. The second entry portion end face 282*b* is formed substantially in parallel with the tapered surface 281*a* formed on the outer peripheral surface of the inner ring contact portion 281. Thus, the second groove side face 233*b* of the annular groove 233 and the second entry portion end face 282*b* face each other in a state in which the second entry portion end face 282*b* inclines relative to the second groove side face 233*b* at an angle corresponding to the angle of the tapered surface 281*a*.

The clearance member 90 is arranged in contact with the second groove side face 233*b* and the second entry portion end face 282*b* in the clearance F between the second groove side face 233*b* and the second entry portion end face 282*b*. The clearance member 90 may slightly be compressed by being pressed between the second groove side face 233*b* and the second entry portion end face 282*b*, or may be disposed such that there is no gap between the clearance member 90 and each of the second groove side face 233*b* and the second entry portion end face 282*b* though the clearance member 90 is not compressed.

The clearance member 90 is formed of an elastic body such as spring steel. The clearance member 90 has a shape of an O-ring, and the shape of a section of the clearance member 90 taken along a plane orthogonal to the axial direction is a circular shape or an elliptical shape. A correlation among a hardness A of the nut, a hardness B of the clearance member 90, and a hardness C of the retainer 80 is represented by Expression (1). Details of effects and the like are described in a manufacturing method to be described in detail below.

$$\text{Hardness } A \text{ of nut } 121 > \text{hardness } B \text{ of clearance member } 90 \geq \text{hardness } C \text{ of retainer } 80 \qquad (1)$$

Next, a method for manufacturing the steering system 110 is described with reference to a flowchart of FIG. 11 and FIG. 12A to FIG. 12D. Specifically, description is provided on how the retainer 80 of the support unit 250 is attached to the nut 121.

Figure 12A:
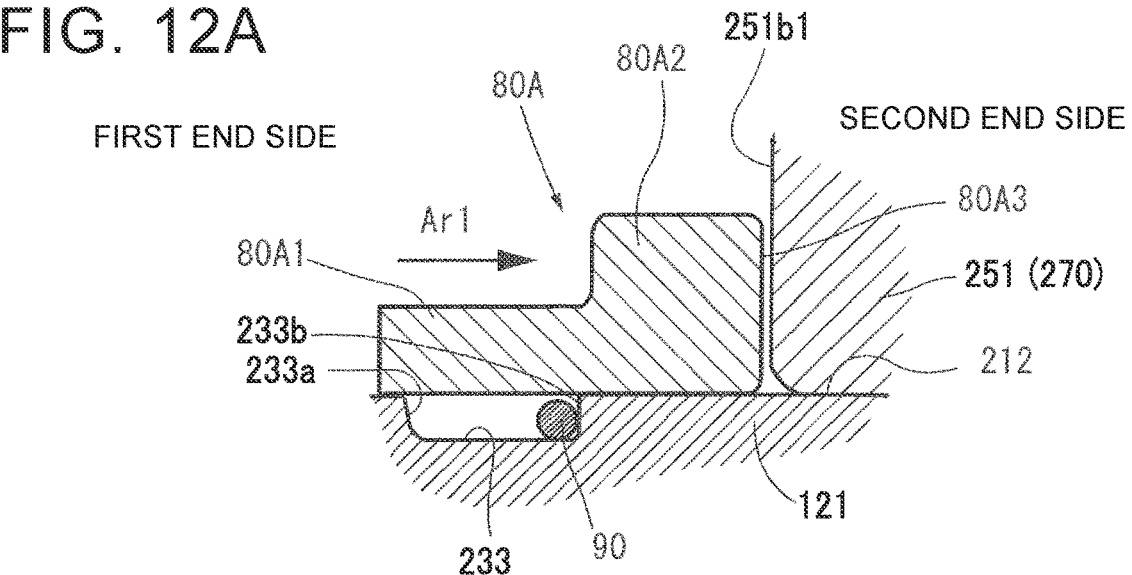
FIG. 12A is a diagram corresponding to S10 of the flowchart in the attaching procedure of FIG. 10.

In a first step S10, a tubular retainer workpiece 80A illustrated in FIG. 12A, which is a workpiece of the retainer 80, is fitted to the outer periphery of the nut 121 at a position at the first end side. That is, the end at the first end side in the nut 121 (i.e., the end of the nut 121, which is located at the first end side) is inserted through the retainer workpiece 80A, and the retainer workpiece 80A is arranged in the vicinity of the double-row angular contact ball bearing 270. The retainer workpiece 80A has a large-diameter cylindrical portion 80A2 arranged on the side of the double-row angular contact ball bearing 270, and a small-diameter cylindrical portion 80A1 arranged on the side of the annular groove 233. At this time, an end face 80A3 of the retainer workpiece 80A, which serves as the inner ring contact portion end face 281b when the retainer 80 is formed, is arranged to face the double-row angular contact ball bearing 270.

Figure 12B:
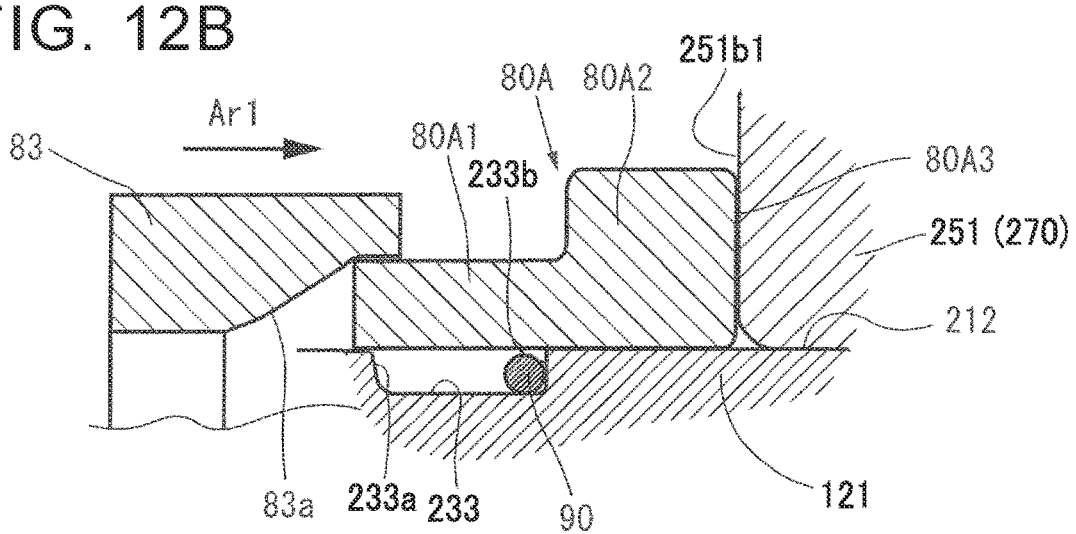
FIG. 12B is a diagram corresponding to S20 of the flowchart in the attaching procedure of FIG. 10.

In a second step S20, as illustrated in FIG. 12B, the distal end at the first end side in the tubular retainer workpiece 80A extending in the axial direction (i.e., the distal end of the tubular retainer workpiece 80A, the distal end being located at the first end side) is inserted into a tubular punch 83 serving as a jig. Then, the punch 83 is urged from the first end side to the second end side as indicated by an arrow Ar1. Thus, the end face 80A3 at the second end side in the retainer workpiece 80A contacts the first inner ring end face 251b1 at the first end side in the inner ring 251 in the double-row angular contact ball bearing 270.

Figure 12C:
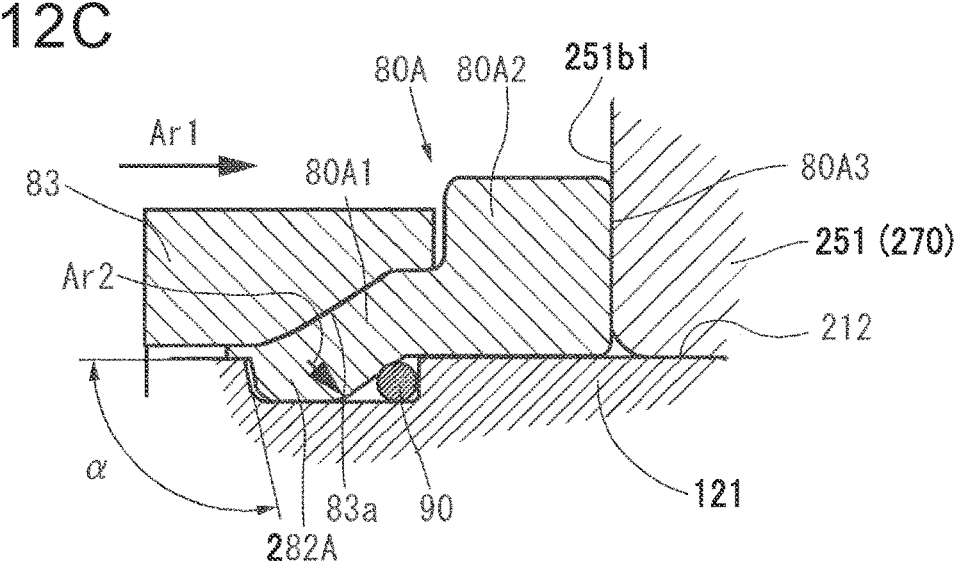
FIG. 12C is a diagram corresponding to S30 of the flowchart in the attaching procedure of FIG. 10.

In a third step S30, as illustrated in FIG. 12C, the punch 83 is further advanced from the first end side to the second end side in a direction indicated by the arrow Ar1 to transfer the inner shape of the punch 83 to the outer peripheral surface of the small-diameter cylindrical portion 80A1 of the retainer workpiece 80A through plastic deformation. The punch 83 has a tapered portion 83a on the inner side. Thus, when the punch 83 is advanced in the direction indicated by the arrow Ar1, the tapered portion 83a is transferred to the outer peripheral surface of the small-diameter cylindrical portion 80A1 to form the tapered surface 281a and to reduce the diameter while deforming the inner periphery of the small-diameter cylindrical portion 80A1 in a direction indicated by an arrow Ar2 in FIG. 12C.

At this time, the first groove side face 233a of the annular groove 233 is formed at the inclination angle α slightly larger than 90 degrees with respect to the outer peripheral surface of the nut 121. Therefore, when the tapered portion 83a of the punch 83 reduces the diameter of the inner peripheral surface of the retainer workpiece 80A while being urged in the advancing direction, an excess portion of the inner peripheral surface of the small-diameter cylindrical portion 80A1 appropriately enters the annular groove 233 along the first groove side face 233a formed at the inclination angle α.

When the punch 83 is further advanced in the direction of the arrow Ar1, the portion of the inner peripheral surface of the retainer workpiece 80A fills the annular groove 233, and then an end face that extends with an angle (inclination) and faces the second groove side face 233b contacts the clearance member 90. Thus, an entry portion workpiece 282A is formed (see FIG. 12C). At this time, the clearance member 90 is sandwiched between the second groove side face 233b and the end face of the entry portion workpiece 282A, the end face being located close to the second groove side face 233b (i.e., the end face facing the second groove side face 233b), and the clearance member 90 is retained in a state in which a predetermined compressive stress σ (not illustrated) is applied.

As described above, the correlation among the hardness A of the nut, the hardness B of the clearance member 90 that is the elastic body, and the hardness C of the entry portion workpiece 282A (=retainer 80) is A>B≥C as represented by Expression (1). Therefore, the entry portion workpiece 282A and the clearance member 90 in the state in which the predetermined compressive stress σ is applied are elastically compressed by an amount corresponding to the applied compressive stress. As illustrated in FIG. 12C, a small clearance may be generated between the first groove side face 233a of the annular groove 233 and the end face of the entry portion workpiece 282A, the end face being located close to the first groove side face 233a and facing the first groove side face 233a. This is because the punch 83 continues to press the retainer workpiece 80A in the direction Ar1. The present disclosure is not limited to the structure with the clearance, and there may be no clearance.

Figure 12D:
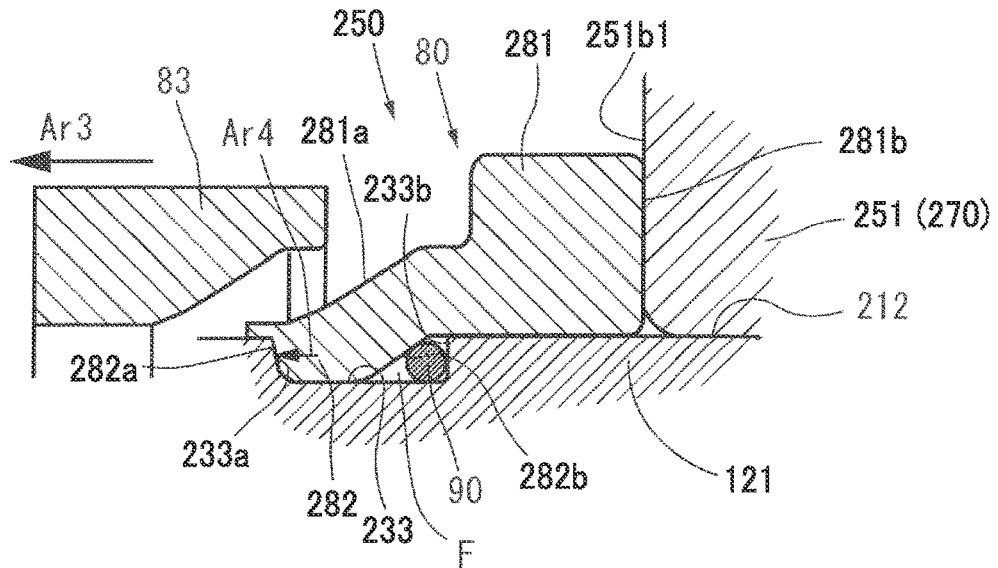
FIG. 12D is a diagram corresponding to S40 of the flowchart in the attaching procedure of FIG. 10.

In a fourth step S40, as illustrated in FIG. 12D, the punch 83 is retreated to the first end side (see an arrow Ar3) from the last position at the second end side in the third step S30. Thus, the compressive stress σ applied to the entry portion workpiece 282A in the advancing direction by the punch 83 is released. When the compressive stress σ is released, the entry portion workpiece 282A and the clearance member 90 expand by an amount corresponding to an amount by which the entry portion workpiece 282A and the clearance member 90 have been elastically deformed in accordance with the magnitude of the applied compressive stress σ.

Thus, the entry portion workpiece 282A and the clearance member 90 expand in a direction of an arrow Ar4 from the second groove side face 233b. Then, the entry portion 282 (retainer 80) is formed, and the first entry portion end face 282a of the entry portion 282 that faces the first groove side face 233a securely contacts the first groove side face 233a. The second entry portion end face 282b of the entry portion 282 has the predetermined clearance F from the second groove side face 233b. The clearance member 90 is arranged in the clearance F, and is sandwiched between the second entry portion end face 282b and the second groove side face 233b.

In the retainer 80, the first entry portion end face 282a securely contacts the first groove side face 233a. The inner ring contact portion end face 281b at the second end side in the retainer 80 securely contacts the first inner ring end face 251b1 at the first end side in the inner ring 251 in the double-row angular contact ball bearing 270. Thus, it is possible to securely restrict movement of the inner ring 251 of the double-row angular contact ball bearing 270 toward the first end side, the inner ring 251 being close to the retainer 80. Accordingly, there is no such case that a gap is generated between the inner rings 251 of the double-row angular contact ball bearing 270 to cause, for example, rattling noise during the operation. Further, it is unlikely that the applied preload is released.

Modified examples of the third embodiment are described. In the third embodiment, both the retainer 80 and the clearance member 90 of the support unit 250 are elastic members, but the present disclosure is not limited to this structure. As Modified Example 1 (not illustrated), only one of the retainer 80 and the clearance member 90 may be the elastic member. In this structure as well, appropriate effects can be expected.

In the third embodiment, the rolling bearing of the support unit 250 is the double-row angular contact ball bearing to which the balls are applied as the rolling elements. The present disclosure is not limited to this structure. As Modified Example 2 (not illustrated), the plurality of rolling elements may be a plurality of tapered rollers. That is, the rolling bearing may be a double-row tapered roller bearing. In this structure as well, effects similar to those of the third embodiment can be expected. Further, the rolling bearing is not limited to the double-row rolling bearing, and may be a single-row rolling bearing. In this structure as well, appropriate effects can be expected.

In the third embodiment, the first groove side face 233a of the annular groove 233 is formed at the inclination angle α slightly larger than 90 degrees with respect to the outer peripheral surface of the nut 121. The present disclosure is not limited to this structure. As Modified Example 3 (not illustrated), the first groove side face 233a of the annular groove 233 may be formed at 90 degrees with respect to the outer peripheral surface of the nut 121. Further, the first groove side face 233a of the annular groove 233 may be formed at an angle much larger than 90 degrees with respect to the outer peripheral surface of the nut 121. In this structure as well, appropriate satisfactory effects can be attained.

The effects of the third embodiment and the modified examples are described. According to the third embodiment, the support unit 250 of the steering system 110 includes the annular groove 233, the bearing support portion 212, the double-row angular contact ball bearing 270 (rolling bearing), the retainer 80, and the clearance member 90. The annular groove 233 is formed on the outer peripheral surface of the nut 121 at a position at the first end side in the axial direction, and has the first groove side face 233a at the first end side and the second groove side face 233b at the second end side. The first groove side face 233a and the second groove side face 233b are formed to extend in the circumferential direction and face each other in the axial direction. The bearing support portion 212 is formed on the outer peripheral surface of the nut 121 at a position closer to the second end side than the annular groove 233 is. The double-row angular contact ball bearing 270 includes the outer ring 252 supported on the housing 111, and the inner ring 251 supported on the bearing support portion 212 so as not to be movable in the axial direction. The inner ring 251 has the first inner ring end face 251b1 on the side of the annular groove 233. The retainer 80 includes the inner ring contact portion 281 having the inner ring contact portion end face 281b that contacts the first inner ring end face 251b1, and the entry portion 282 having the first entry portion end face 282a that contacts the first groove side face 233a of the annular groove 233 in the state in which the first inner ring end face 251b1 contacts the inner ring contact portion end face 281b, and the second entry portion end face 282b that faces the second groove side face 233b via the clearance. The clearance member 90 is arranged in the clearance such that the clearance member 90 is in contact with the second groove side face 233b and the second entry portion end face 282b.

The entry portion 282 of the retainer 80 of the support unit 250 enters the annular groove 233. The inner ring contact portion end face 281b at one of the two ends of the retainer 80 contacts the first inner ring end face 251b1 of the inner ring 251. The first entry portion end face 282a of the entry portion 282 contacts the first groove side face 233a of the annular groove 233. Thus, the retainer 80 securely restricts the movement of the double-row angular contact ball bearing 270 toward the retainer 80. In the present disclosure, the clearance member 90 is arranged in the clearance F in the annular groove 233 such that the clearance member 90 is in contact with the second groove side face 233b and the second entry portion end face 282b. Therefore, the entry portion 282 is immovable to the second end side in the annular groove 233. Thus, the first entry portion end face 282a is not (i.e., is not moved) away from the first groove side face 233a of the annular groove 233. Accordingly, the retainer 80 can securely restrict the movement of the double-row angular contact ball bearing 270 (rolling bearing) toward the retainer 80, that is, fix the double-row angular contact ball bearing 270 such that rattling (backlash) does not occur. With the significantly low cost structure in which the clearance member 90 is added in the clearance F in the annular groove 233, the retainer 80 can further securely prevent the movement of the inner ring 251 of the double-row angular contact ball bearing 270 (rolling bearing) toward the first end side.

According to the third embodiment, the clearance member 90 has a shape of an O-ring, and the shape of a section of the clearance member 90 taken along a plane orthogonal to the axial direction is a circular shape. Thus, when the clearance member 90 is sandwiched between the second groove side face 233b of the annular groove 233 and the second entry portion end face 282b of the entry portion 282, the clearance member 90 can appropriately urge the entry portion 282 toward the first groove side face 233a irrespective of a contact direction or position.

According to the third embodiment, the rolling bearing is the double-row angular contact ball bearing 270. Thus, a high rigidity (stiffness) of the bearing can be secured by manufacturing the bearing so that a predetermined preload is applied to the inner rings 251 when the inner rings 251 are fixed in the axial direction by using the support unit 250.

The method for manufacturing the steering system 110 according to the third embodiment includes the first step S10 of fitting the tubular retainer workpiece 80A, which is the workpiece of the retainer 80, to the outer periphery of the nut 121 at a position at the first end side, and the second step S20 of inserting, into the tubular punch 83 serving as the jig, the distal end of the tubular retainer workpiece 80A extending in the axial direction, and urging the punch 83 from the first end side to the second end side to bring the end face 80A3 of the large-diameter cylindrical portion 80A2 of the retainer workpiece 80A into contact with the first inner ring end face 251b1 at the first end side in the inner ring 251. Further, the method includes the third step S30 of advancing the punch 83 from the first end side to the second end side to transfer the inner shape of the punch 83 to the outer peripheral surface of the small-diameter cylindrical portion 80A1, plastically deforming the portion of the inner periphery of the small-diameter cylindrical portion 80A1 such that the portion of the inner periphery of the small-diameter cylindrical portion 80A1 enters the annular groove 233, and bringing the end face (i.e., the end face of the small-diameter cylindrical portion 80A1, in other words, the end face of retainer workpiece 80A) facing the second groove side face 233b into contact with the clearance member 90 to form the entry portion workpiece 282A, which is the workpiece of the entry portion 282, and the fourth step S40 of retreating the punch 83 from the second end side to the first end side to form the entry portion 282 by releasing the compressive stress σ applied to the entry portion workpiece 282A in the advancing direction of the punch 83.

In the manufacturing method, when the punch 83 retreats in the fourth step S40 to release the compressive stress σ applied to the entry portion workpiece 282A, the entry portion workpiece 282A expands by an amount corresponding to the compressive stress σ applied in the advancing direction and a Young's modulus (i.e., a modulus of longitudinal elasticity) of the entry portion workpiece 282A. In the clearance F in the annular groove 233, the clearance member 90 is arranged in contact with the second groove side face 233b and the second entry portion end face 282b in the state in which the punch 83 retreats to release the compressive stress σ. In other words, in a state in which the compressive stress σ applied to the entry portion workpiece 282A is not released, the clearance member 90 is also compressed by a predetermined amount. Therefore, in the state in which the compressive stress σ is released, the clearance member 90 expands by an amount corresponding to the compressive stress in the advancing direction and a Young's modulus of the clearance member 90 similarly to the entry portion workpiece 282A. Through the expansion of both the entry portion workpiece 282A and the clearance member 90 when the compressive stress σ is released, the contact between the clearance member 90 and each of the second groove side face 233b and the second entry portion end face 282b is appropriately secured. Therefore, the entry portion 282 cannot move toward the second end side in the annular groove 233. Thus, the retainer 80 can securely restrict the movement of the double-row angular contact ball bearing 270 (rolling bearing) toward the retainer 80.

According to the manufacturing method of the third embodiment, at least one of the retainer 80 and the clearance member 90 is formed of the elastic body. Thus, when the punch 83 is retreated to the first end side (in the direction of the arrow Ar3) and the compressive stress σ is released in the fourth step S40 of the manufacturing method of the third embodiment, at least one of the retainer 80 and the clearance member 90 expands greatly. Thus, the first entry portion end face 282a of the entry portion 282 is moved toward the first groove side face 233a, and the first entry portion end face 282a can appropriately contact the first groove side face 233a.

According to the manufacturing method of the third embodiment, the hardness of the nut 121 is larger than the hardness of the clearance member 90, and the hardness of the clearance member 90 is equal to or larger than the hardness of the retainer 80. The hardness of the nut 121 is larger than the hardnesses of the clearance member 90 and the retainer 80. Thus, when the punch 83 is retreated to the first end side in the fourth step S40 of the manufacturing method of the third embodiment, appropriate expansion of the clearance member 90 and the entry portion 282 of the retainer 80 from the hard nut 121 that is difficult to deform can be expected. Accordingly, the first entry portion end face 282a of the entry portion 282 can appropriately contact the first groove side face 233a.

According to the manufacturing method of the third embodiment, the angle formed between the first groove side face 233a of the annular groove 233 and the portion of the outer peripheral surface of the nut 121 is larger than 90 degrees, the portion of the outer peripheral surface of the nut 121 being located closer to the first end side than the annular groove 233 is. Thus, when the punch 83 is advanced to the second end side and the entry portion workpiece 282A is caused to enter the annular groove 233 in the third step S30 of the manufacturing method of the third embodiment, the entry portion workpiece enters the annular groove 233 easily and smoothly.

According to the manufacturing method of the third embodiment, the inner shape of the punch 83 includes the tapered portion 83a. By providing the tapered portion 83a, the inner periphery of the entry portion workpiece 282A can also be plastically deformed into a desired shape, and the entry portion workpiece 282A can be suitably caused to enter the annular groove 233.

Next, a steering system 200 of a fourth embodiment (see FIG. 8) is described. In the third embodiment, the support unit 250 of the steering system 110 includes the clearance member 90 arranged in the annular groove 233 such that the clearance member 90 is in contact with the second groove side face 233b and the second entry portion end face 282b of the entry portion 282. The clearance member 90 is arranged in the clearance F between the second groove side face 233b and the second entry portion end face 282b. The present disclosure is not limited to this structure. As the fourth embodiment, a support unit 150 may not include the clearance member 90. The following description is directed only to the difference from the support unit 250, and description of other similar parts is omitted. Components similar to those of the support unit 250 are described with the same reference symbols.

Figure 13:
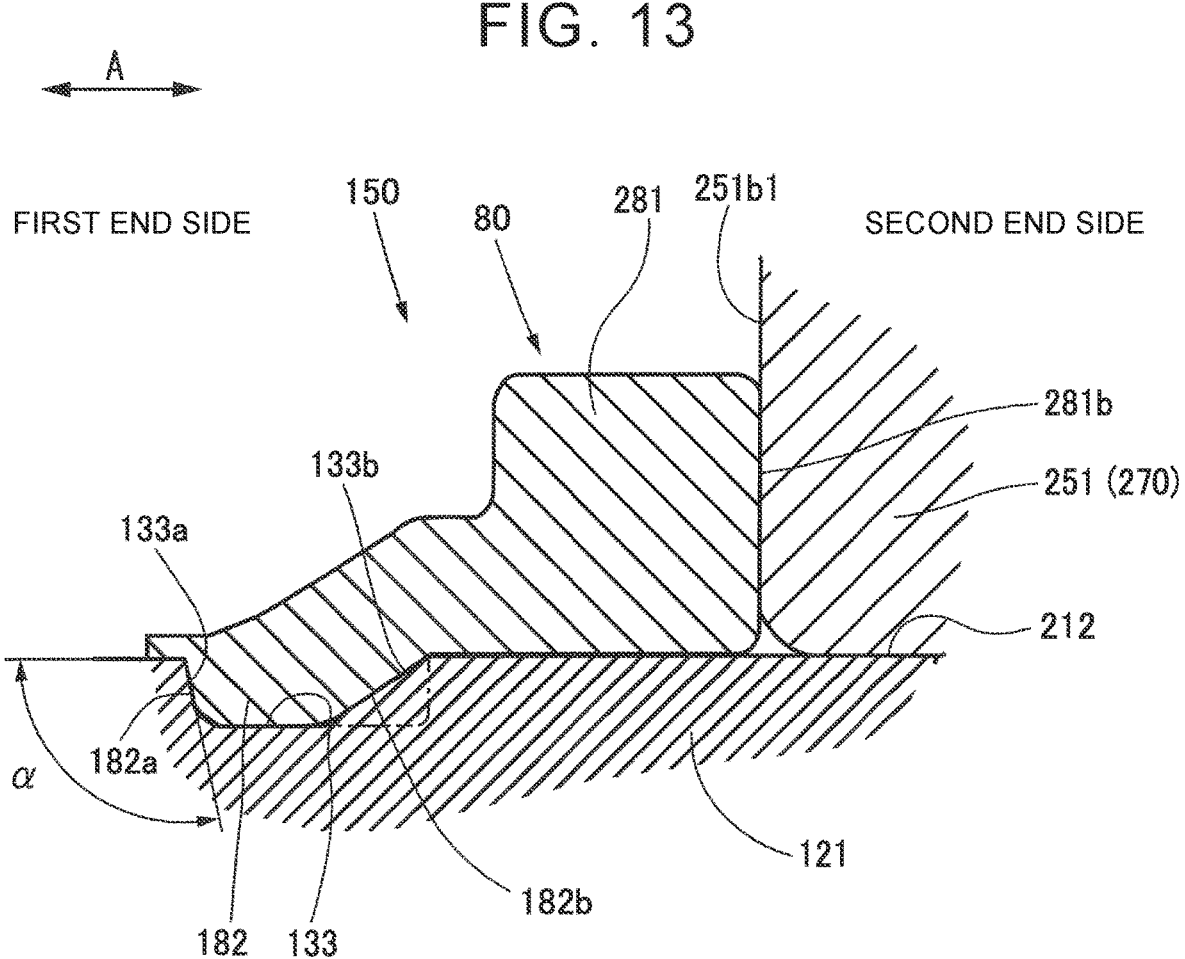
FIG. 13 is an explanatory drawing of the support unit corresponding to FIG. 10 according to the fourth embodiment.

As illustrated in FIG. 13, an entry portion 182 of the support unit 150, which corresponds to the entry portion 282 of the third embodiment, has a first entry portion end face 182a and a second entry portion end face 182b. Similarly to the support unit 250, the inner ring contact portion 281 has the inner ring contact portion end face 281b that contacts the first inner ring end face 251b1. The first entry portion end face 182a contacts a first groove side face 133a of an annular groove 133 in a state in which the first inner ring end face 251b1 contacts the inner ring contact portion end face 281b. The second entry portion end face 182b directly contacts a second groove side face 133b.

Figure 14:
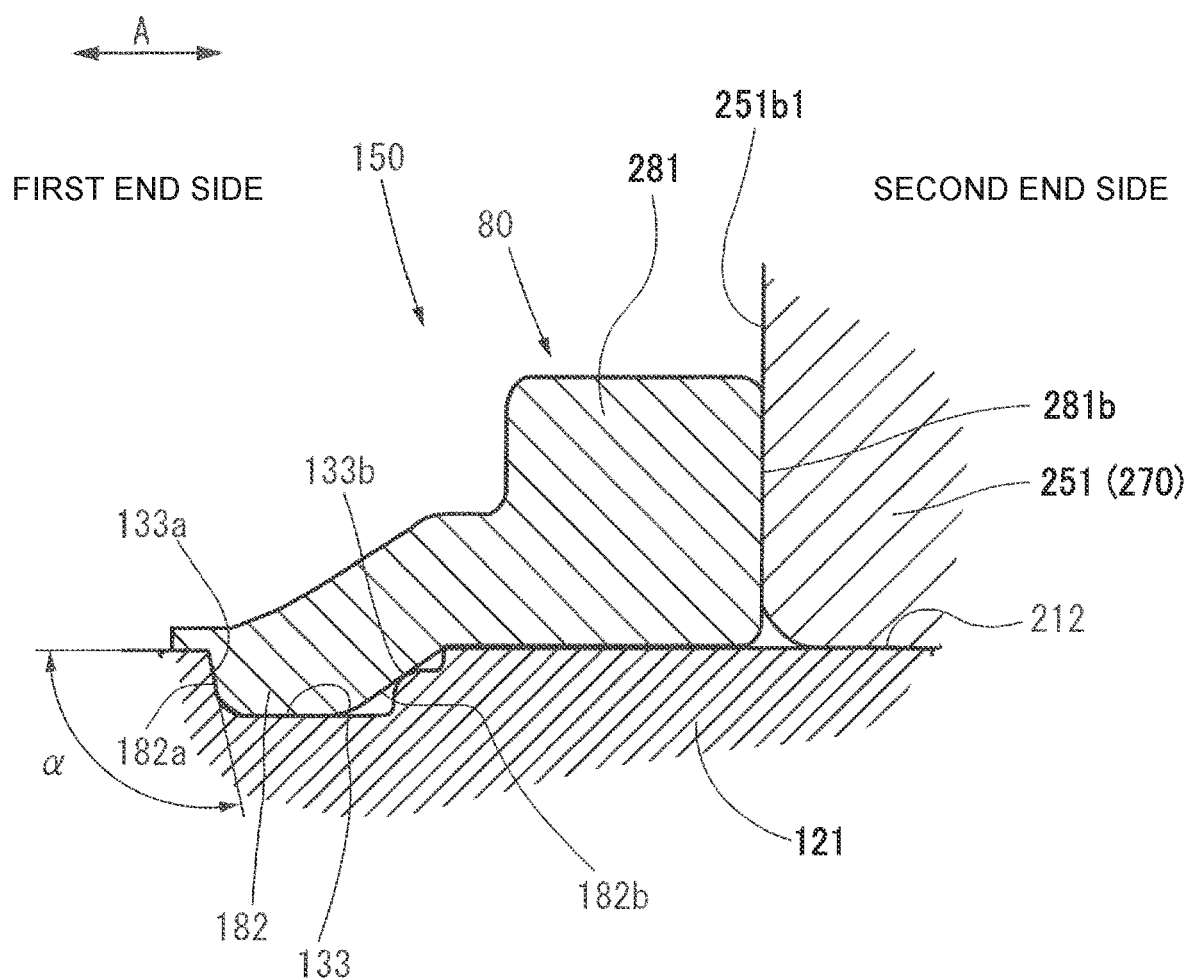
FIG. 14 is an explanatory drawing of a modification of the fourth embodiment.

The second groove side face 133b is shaped to project toward the first groove side face 133a as compared to the second groove side face 233b of the third embodiment, and is formed into a shape of a slope along the second groove side face 133b. The projecting shape may be a stepped shape of a modification of FIG. 14, in which the edge (i.e., the corner) of the step contacts the second entry portion end face 182b. In the fourth embodiment, the second groove side face 133b, with which the second entry portion end face 182b is in direct contact, is a part of the nut 121. Thus, the hardness is higher than that of the clearance member 90.

Therefore, when the punch 83 is retreated to the first end side (see the arrow Ar3) and the compressive stress σ is released in the fourth step S40 of the manufacturing method of the third embodiment, the second groove side face 133b does not expand greatly unlike the clearance member 90 of the third embodiment. Thus, the amount of movement of the first entry portion end face 182a of the entry portion 182 toward the first groove side face 133a is small. However, it is expected that the entry portion 182 expands by an amount corresponding to an amount by which the entry portion 182 has been deformed due to elasticity of the entry portion 182. Therefore, appropriate effects can be expected.

In the third and fourth embodiments, the double-row angular contact ball bearing 270 including the two inner rings 251 is applied as each of the bearings of the support units 250 and 150. The present disclosure is not limited to this structure. The double-row angular contact ball bearing may be formed such that the inner ring arranged at the first end side out of the inner rings for use is formed separately from the nut 121 and a second inner ring is formed at the second end side integrally with the nut 121. Thus, costs can be reduced.

The present disclosure is not limited to the steering systems 110 and 200 of the third and fourth embodiments, and may be applied to a steer-by-wire steering system for a vehicle. The present disclosure may also be applied to a steering system for a self-driving vehicle.

In the third and fourth embodiments, the support units 250 and 150 are applied to the rack parallel type steering systems 110 and 200. The present disclosure is not limited to this structure. For example, the support units 250 and 150 may be applied to a steering system of a type in which the rotation axis of the motor is located at the same position as that of the axis of the shaft 120 (i.e., the rotation axis of the motor is located coaxially with the axis of the shaft 120) (for example, a steering system described in Japanese Patent No. 5120040 (JP 5120040 B)). Further, the support units 250 and 150 may be applied to any apparatuses using bearings.

What is claimed is:

1. A steering system comprising:
    a steered shaft having an outer peripheral ball screw groove helically provided on an outer peripheral surface and configured to move in an axial direction of the steered shaft to turn steered wheels of a vehicle;
    a ball screw nut having a tubular shape and having an inner peripheral ball screw groove helically provided on an inner peripheral surface, the steered shaft being inserted through a center of the ball screw nut;
    a plurality of balls configured to circulate along the outer peripheral ball screw groove and the inner peripheral ball screw groove;
    a housing that houses the ball screw nut;
    a rolling bearing arranged between an outer peripheral surface of the ball screw nut and an inner surface of the housing and configured to support the ball screw nut such that the ball screw nut is rotatable relative to the housing; and
    a snap ring fitted to a recess provided on the outer peripheral surface of the ball screw nut and configured to prevent the rolling bearing from detaching from the ball screw nut, wherein
    the rolling bearing includes:
        double-row rolling element arrays arranged side by side in an axial direction of the ball screw nut;
        an outer ring having a pair of raceway surfaces on each of which a plurality of rolling elements of a corresponding one of the double-row rolling element arrays roll;
        a first inner ring having a raceway surface on which the plurality of rolling elements of one of the double-row rolling element arrays roll; and
        a second inner ring having a raceway surface on which the plurality of rolling elements of another of the double-row rolling element arrays roll,
    the ball screw nut has a receiving portion that protrudes outward relative to a first outer peripheral fitting surface to which the first inner ring is externally fitted, the receiving portion contacting a side face of the first inner ring, and the ball screw nut has a second outer peripheral fitting surface to which the second inner ring is externally fitted, the second outer peripheral fitting surface being located closer to the recess than the first outer peripheral fitting surface is,
    the snap ring contacts a side face of the second inner ring to push the second inner ring toward the receiving portion via the first inner ring, and
    a resistance force received from the second outer peripheral fitting surface when the second inner ring moves in the axial direction of the ball screw nut in a state in which detachment of the rolling bearing is not prevented by the snap ring is smaller than a pushing force with which the snap ring pushes the second inner ring.

2. The steering system according to claim 1, wherein an inside diameter of the second inner ring is larger than an inside diameter of the first inner ring.

3. The steering system according to claim 1, wherein an outside diameter of the second outer peripheral fitting surface is smaller than an outside diameter of the first outer peripheral fitting surface.

4. The steering system according to claim 1, wherein the first inner ring is fitted to the first outer peripheral fitting surface by interference fit, and the second inner ring is fitted to the second outer peripheral fitting surface by clearance fit.

5. The steering system according to claim 1, wherein the snap ring is fixed to the ball screw nut by being plastically deformed such that a part of the snap ring enters the recess.

6. A steering system comprising:
    a housing;
    a shaft supported by the housing, having opposite ends coupled to steered wheels via link mechanisms, and configured to turn the steered wheels by moving in an axial direction of the shaft relative to the housing;
    a ball screw apparatus including
        an outer peripheral rolling groove provided on an outer peripheral surface of the shaft,
        a nut having a tubular shape and arranged radially outward of the outer peripheral rolling groove,
        an inner peripheral rolling groove provided on an inner peripheral surface of the nut, and
        a plurality of rolling elements configured to roll between the outer peripheral rolling groove and the inner peripheral rolling groove;
    a driving force application apparatus configured to apply a driving force in the axial direction to the shaft by rotating the nut of the ball screw apparatus using a motor as a drive source; and
    a support unit configured to support the nut in the housing, wherein
    the support unit includes:
        an annular groove provided on an outer peripheral surface of the nut at a position at a first end side in the axial direction and having a first groove side face at the first end side and a second groove side face at a second end side, the first groove side face and the second groove side face extending in a circumferential direction and facing each other in the axial direction;
        a bearing support portion provided on the outer peripheral surface of the nut at a position closer to the second end side than the annular groove is;
        a rolling bearing including
            an outer ring supported on the housing, and
            an inner ring supported on the bearing support portion so as not to be movable in the axial direction and having a first inner ring end face on a side of the annular groove;
        a retainer including
            an inner ring contact portion having an inner ring contact portion end face that contacts the first inner ring end face, and
            an entry portion having
                a first entry portion end face that contacts the first groove side face of the annular groove in a state in which the first inner ring end face contacts the inner ring contact portion end face, and
                a second entry portion end face that faces the second groove side face via a clearance; and
        a clearance member arranged in the clearance such that the clearance member is in contact with the second groove side face and the second entry portion end face.

7. The steering system according to claim 6, wherein at least one of the retainer and the clearance member is formed of an elastic body.

8. The steering system according to claim 6, wherein the rolling bearing is a double-row angular contact ball bearing.

9. The steering system according to claim 6, wherein an angle formed between the first groove side face of the annular groove and a portion of the outer peripheral surface of the nut is larger than 90 degrees, the portion of the outer peripheral surface of the nut being located closer to the first end side than the annular groove is.

10. The steering system according to claim 6, wherein the clearance member has a shape of an O-ring, and a shape of a section of the clearance member taken along a plane orthogonal to the axial direction is a circular shape.

11. The steering system according to claim 10, wherein a hardness of the nut is larger than a hardness of the clearance member, and the hardness of the clearance member is equal to or larger than a hardness of the retainer.

12. A method for manufacturing the steering system according to claim 6, comprising attaching the retainer of the support unit to the nut, the attaching the retainer including:
    a first step of fitting a retainer workpiece having a tubular shape, which is a workpiece of the retainer, to an outer periphery of the nut at a position at the first end side;
    a second step of inserting, into a punch having a tubular shape and serving as a jig, a distal end of the retainer workpiece having the tubular shape and extending in the axial direction, and urging the punch from the first end side to the second end side to bring an end face at the second end side in the retainer workpiece into contact with an end face at the first end side in the inner ring;
    a third step of advancing the punch from the first end side to the second end side to transfer an inner shape of the punch to an outer peripheral surface of the retainer workpiece, plastically deforming a portion of the retainer workpiece such that the portion of the retainer workpiece enters the annular groove, and bringing an end face facing the second groove side face of the annular groove into contact with the clearance member to form an entry portion workpiece, which is a workpiece of the entry portion, the second groove side face facing the first groove side face; and
    a fourth step of retreating the punch from the second end side to the first end side to form the entry portion by releasing a compressive stress applied to the entry portion workpiece in an advancing direction of the punch.

13. The method for manufacturing the steering system according to claim 12, wherein the rolling bearing is a double-row angular contact ball bearing.

14. The method for manufacturing the steering system according to claim 12, wherein an angle formed between the first groove side face of the annular groove and a portion of the outer peripheral surface of the nut is larger than 90 degrees, the portion of the outer peripheral surface of the nut being located closer to the first end side than the annular groove is.

15. The method for manufacturing the steering system according to claim 12, wherein the inner shape of the punch includes a tapered portion.

16. The method for manufacturing the steering system according to claim 12, wherein at least one of the retainer and the clearance member is formed of an elastic body.

17. The method for manufacturing the steering system according to claim 16, wherein a hardness of the nut is larger than a hardness of the clearance member, and the hardness of the clearance member is equal to or larger than a hardness of the retainer.

18. A method for manufacturing a steering system comprising:
    a housing;
    a shaft supported in the housing, having opposite ends coupled to steered wheels via link mechanisms, and configured to turn the steered wheels by moving in an axial direction of the shaft relative to the housing;
    a ball screw apparatus including
        an outer peripheral rolling groove provided on an outer peripheral surface of the shaft,
        a nut having a tubular shape and arranged radially outward of the outer peripheral rolling groove,
        an inner peripheral rolling groove provided on an inner peripheral surface of the nut, and
        a plurality of rolling elements configured to roll between the outer peripheral rolling groove and the inner peripheral rolling groove;
    a driving force application apparatus configured to apply a driving force in the axial direction to the shaft by rotating the nut of the ball screw apparatus using a motor as a drive source; and
    a support unit configured to support the nut in the housing, wherein
the support unit includes:
    an annular groove provided on an outer peripheral surface of the nut at a position at a first end side in the axial direction and having a first groove side face at the first end side and a second groove side face at a second end side, the first groove side face and the second groove side face extending in a circumferential direction and facing each other in the axial direction;
    a bearing support portion provided on the outer peripheral surface of the nut at a position closer to the second end side than the annular groove is;
    a rolling bearing including
        an outer ring supported on the housing, and
        an inner ring supported on the bearing support portion so as not to be movable in the axial direction and having a first inner ring end face on a side of the annular groove; and
    a retainer including
        an inner ring contact portion having an inner ring contact portion end face that contacts the first inner ring end face, and
        an entry portion having
            a first entry portion end face that contacts the first groove side face of the annular groove in a state in which the first inner ring end face contacts the inner ring contact portion end face, and
            a second entry portion end face that contacts the second groove side face,
the method for manufacturing the steering system comprising attaching the retainer of the support unit to the nut, the attaching the retainer including:
    a first step of fitting a retainer workpiece having a tubular shape, which is a workpiece of the retainer, to an outer periphery of the nut at a position at the first end side;
    a second step of inserting, into a punch having a tubular shape and serving as a jig, a distal end of the retainer workpiece having the tubular shape and extending in the axial direction, and urging the punch from the first end side to the second end side to bring an end face at the second end side in the retainer workpiece into contact with an end face at the first end side in the inner ring;
    a third step of advancing the punch from the first end side to the second end side to transfer an inner shape of the punch to an outer peripheral surface of the retainer workpiece, plastically deforming a portion of the retainer workpiece such that the portion of the retainer workpiece enters the annular groove, and bringing an end face facing the second groove side face of the annular groove into contact with the second groove side face to form an entry portion workpiece, which is a workpiece of the entry portion, the second groove side face facing the first groove side face; and a fourth step of retreating the punch from the second end side to the first end side to form the entry portion by releasing a compressive stress applied to the entry portion workpiece in an advancing direction of the punch.

19. The method for manufacturing the steering system according to claim 18, wherein the rolling bearing is a double-row angular contact ball bearing.

20. The method for manufacturing the steering system according to claim 18, wherein an angle formed between the first groove side face of the annular groove and a portion of the outer peripheral surface of the nut is larger than 90 degrees, the portion of the outer peripheral surface of the nut being located closer to the first end side than the annular groove is.

21. The method for manufacturing the steering system according to claim 18, wherein the inner shape of the punch includes a tapered portion.

* * * * *